(12) United States Patent
Nakarmi et al.

(10) Patent No.: US 12,445,836 B2
(45) Date of Patent: Oct. 14, 2025

(54) DISTRIBUTED UNIT NODE, USER EQUIPMENT, AND METHODS IN A WIRELESS COMMUNICATIONS NETWORK

(71) Applicant: Telefonaktiebolaget LM Ericsson (publ), Stockholm (SE)

(72) Inventors: Prajwol Kumar Nakarmi, Sollentuna (SE); Oumer Teyab, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 363 days.

(21) Appl. No.: 18/027,681

(22) PCT Filed: Sep. 30, 2020

(86) PCT No.: PCT/SE2020/050917
§ 371 (c)(1),
(2) Date: Mar. 22, 2023

(87) PCT Pub. No.: WO2022/071836
PCT Pub. Date: Apr. 7, 2022

(65) Prior Publication Data
US 2023/0388790 A1    Nov. 30, 2023

(51) Int. Cl.
*H04L 9/00* (2022.01)
*H04W 12/0431* (2021.01)
(Continued)

(52) U.S. Cl.
CPC ..... *H04W 12/0431* (2021.01); *H04W 12/106* (2021.01); *H04W 12/79* (2021.01)

(58) Field of Classification Search
CPC ........ H04L 63/12; H04L 63/18; H04W 12/06; H04W 12/04; H04W 12/03;
(Continued)

(56) References Cited

U.S. PATENT DOCUMENTS

2019/0306684 A1* 10/2019 Zhang ................ H04W 12/041
2021/0112408 A1*  4/2021 Pazhyannur ........ H04W 12/041

FOREIGN PATENT DOCUMENTS

WO    2020150025 A1    7/2020

OTHER PUBLICATIONS

International Search Report and Written Opinion dated May 10, 2021 for International Application No. PCT/SE2020/050917 filed Sep. 30, 2020, consisting of 13-pages.
(Continued)

*Primary Examiner* — Phuoc H Doan
(74) *Attorney, Agent, or Firm* — Weisberg I.P. Law, P.A.

(57) ABSTRACT

A method performed by a Distributed Unit, DU, node for handling a message in a communication between a User Equipment, UE, the DU node and a Central Unit, CU, node. The DU node obtains a secondary security key from a network node. The secondary security key is associated with the DU node. The DU node receives the message from the UE or the CU node. The message is security protected with one or both of a first security key, and the secondary security key. The message or a part of the message, is not possible to use by the DU node when security protected with the first security key. The DU node determines that at least a part of the message is security protected with the secondary security key. The DU node uses the at least the part of the message security protected with the secondary security key.

20 Claims, 22 Drawing Sheets

---

1601. Obtain a first security key associated with the CU node, and a secondary security key associated with the DU node wherein a message security protected with the first security key is not possible to use by the DU node.

1602. Determine which one out of the first security key and the secondary security key that is to be used for at least a part of a message, for security protection.

1603. When determining that the secondary security key is used for at least a part of the message for security protection, the UE communicates the message with the DU node.

(51) Int. Cl.
*H04W 12/106* (2021.01)
*H04W 12/79* (2021.01)

(58) Field of Classification Search
CPC ........... H04W 12/006; H04W 12/1006; H04W 76/11; H04W 12/02
See application file for complete search history.

(56) References Cited

OTHER PUBLICATIONS

3GPP TSG RAN Meeting #86 RP-193251 (revision of RP-193145); Title: New WID on Enhancements to Integrated Access and Backhaul; Agenda Item: 9.1.2; Source: Qualcomm; Document for: Approval; Date and Location: Dec. 9-12, 2019, Sitges, Spain, consisting of 5-pages.
3GPP TS 33.501 V16.3.0; 3rd Generation Partnership Project; Technical Specification Group Services and System Aspects; Security architecture and procedures for 5G system (Release 16); Jul. 2020, consisting of 248-pages.
3GPP TS 38.323 V16.1.0; 3rd Generation Partnership Project; Technical Specification Group Radio Access Network; NR; Packet Data Convergence Protocol (PDCP) specification (Release 16); Jul. 2020, consisting of 40-pages.
3GPP TS 33.210 V16.4.0; 3rd Generation Partnership Project; Technical Specification Group Services and System Aspects; Network Domain Security (NDS); IP network layer security (Release 16); Jul. 2020, consisting of 27-pages.
3GPP TS 38.300 V16.2.0; 3rd Generation Partnership Project; Technical Specification Group Radio Access Network; NR; NR and NG-RAN Overall Description; Stage 2 (Release 16); Jul. 2020, consisting of 148-pages.
3GPP TS 38.401 V16.2.0; 3rd Generation Partnership Project; Technical Specification Group Radio Access Network; NG-RAN; Architecture description (Release 16); Jul. 2020, consisting of 77-pages.
3GPP TS 38.463 V16.2.0; 3rd Generation Partnership Project; Technical Specification Group Radio Access Network; NG-RAN; E1 Application Protocol (E1AP) (Release 16); Jul. 2020, consisting of 230-pages.
3GPP TS 38.473 V16.2.0; 3rd Generation Partnership Project; Technical Specification Group Radio Access Network; NG-RAN; F1 application protocol (F1AP) Release 16); Jul. 2020, consisting of 363-pages.
3GPP TR 38.874 V16.0.0; 3rd Generation Partnership Project; Technical Specification Group Radio Access Network; NR; Study on Integrated Access and Backhaul (Release 16); Dec. 2018, consisting of 111-pages.

* cited by examiner

1601. Obtain a first security key associated with the CU node, and a secondary security key associated with the DU node wherein a message security protected with the first security key is not possible to use by the DU node.

1602. Determine which one out of the first security key and the secondary security key that is to be used for at least a part of a message, for security protection.

1603. When determining that the secondary security key is used for at least a part of the message for security protection, the UE communicates the message with the DU node.

Fig. 16

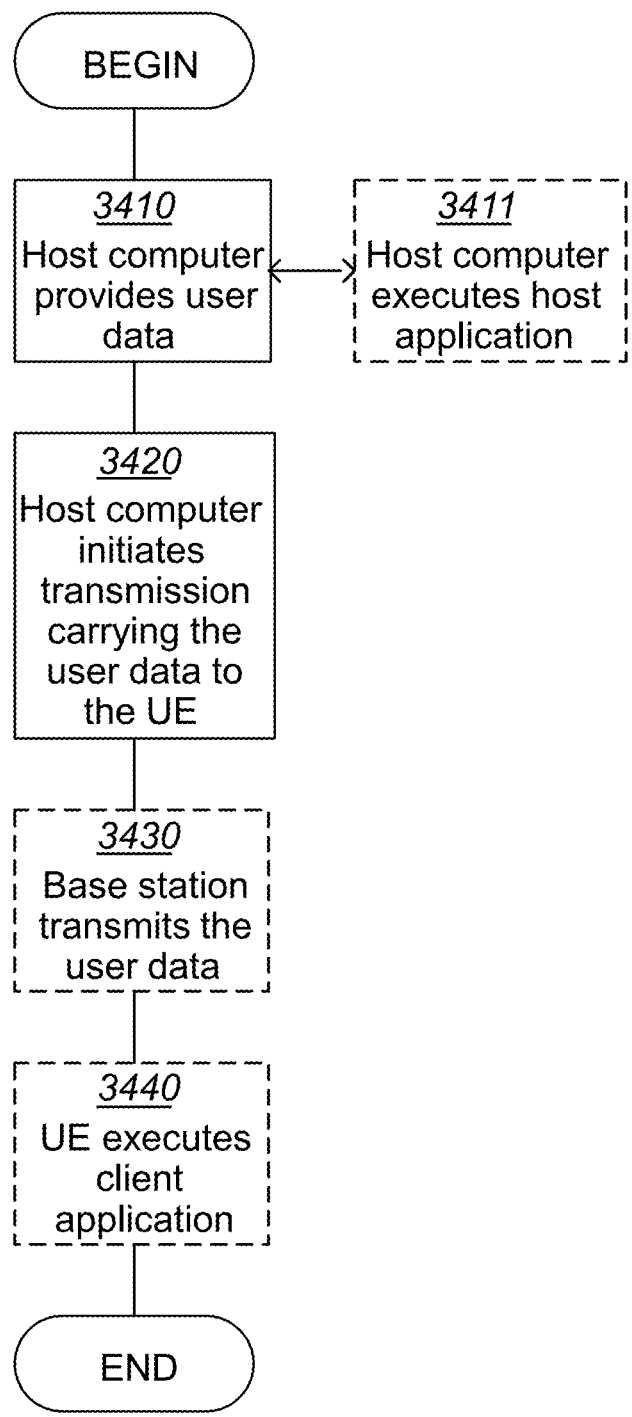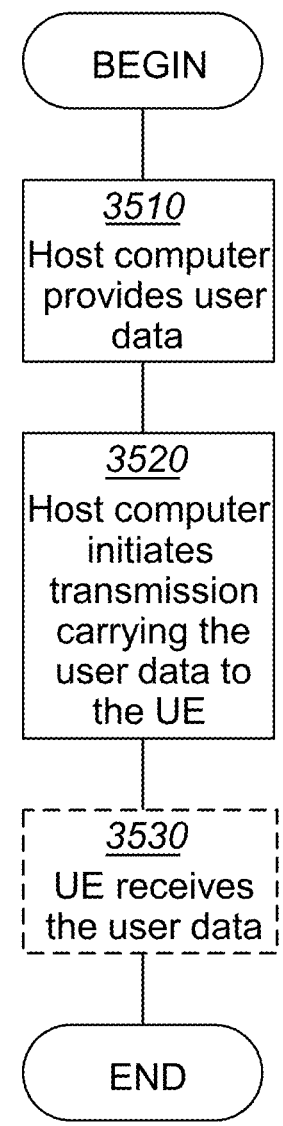
Fig. 21
Fig. 22

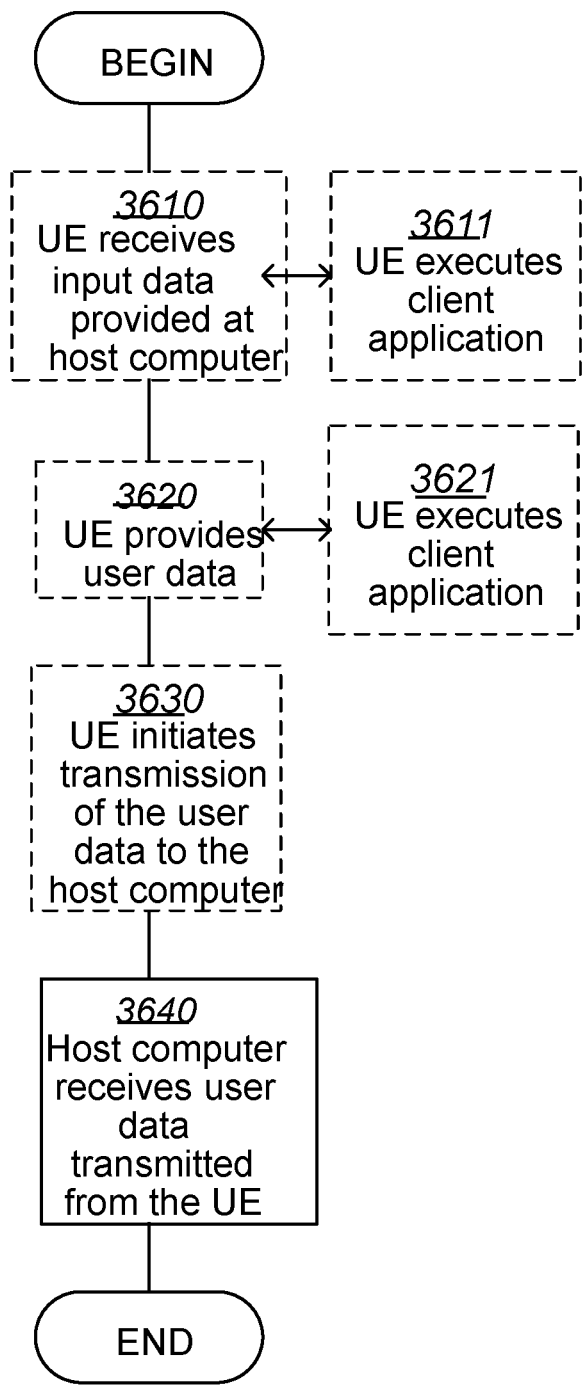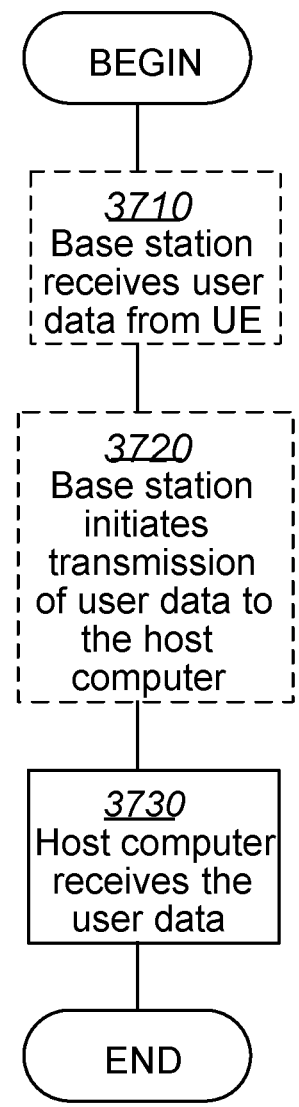
Fig. 23
Fig. 24

DISTRIBUTED UNIT NODE, USER EQUIPMENT, AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2020/050917, filed Sep. 30, 2020 entitled "DISTRIBUTED UNIT NODE, USER EQUIPMENT, AND METHODS IN A WIRELESS COMMUNICATIONS NETWORK," the entirety of which is incorporated herein by reference.

TECHNICAL FIELD

Embodiments herein relate to a Distributed Unit (DU) node, a User Equipment (UE), and methods therein. In some aspects, they relate to handling a message in a connection between the UE, the DU node and a Central Unit (CU) node in a wireless communications network.

Embodiments herein further relates to computer programs and carriers corresponding to the above methods, DU and UE.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Overall Architecture of NG-RAN Architecture

FIG. 1 depicts NG-RAN overall architecture.

The NG-RAN comprises a set of gNBs connected to the 5GC through the NG interface.

NG-RAN can also comprise a set of ng-eNBs. An ng-eNB may comprise an ng-eNB-CU and one or more ng-eNB-DUs. An ng-eNB-CU and an ng-eNB-DU are connected via W1 interface. The general principle described in this section also applies to ng-eNB and W1 interface, if not explicitly specified otherwise. A gNB can support Frequency Division Duplex (FDD) mode, Time Division Duplex (TDD) mode or dual mode operation. gNBs can be interconnected through the Xn interface. A gNB may consist of a gNB-CU and one or more gNB-DUs. A gNB-CU and a gNB-DU are connected via F1 interface. One gNB-DU is connected to only one gNB-CU.

NOTE: In case of network sharing with multiple cell identity (ID) broadcast, each Cell Identity associated with a subset of Public Land Mobile Networks (PLMNs) corresponds to a gNB-DU and the gNB-CU it is connected to, i.e. the corresponding gNB-DUs share the same physical layer cell resources.

NOTE: For resiliency, a gNB-DU may be connected to multiple gNB-CUs by appropriate implementation.

NG, Xn and F1 are logical interfaces. For NG-RAN, the NG and Xn-C interfaces for a gNB consisting of a gNB-CU and gNB-DUs, terminate in the gNB-CU. For Evolved Universal Terrestrial Radio Access (E-UTRA) NR-Dual Connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5G Core Network (5GC) as a gNB. A possible deployment scenario comprises a node hosting user plane part of NR Packet Data Convergence Protocol (PDCP), e.g. gNB-CU, gNB-CU-UP, and for EN-DC, Master eNB (MeNB) or Secondary gNB SgNB) depending on the bearer split, shall perform user inactivity monitoring and further informs its inactivity or reactivation to the node having a Control Plane (C-plane) connection towards the core network, e.g. over E1, X2. The E1 interface is an interface between the gNB-CU-CP and gNB-CU-UP.

The node hosting NR RLC, e.g. a gNB-DU, may perform user inactivity monitoring and further inform its inactivity or reactivation to the node hosting the control plane, e.g. gNB-CU or gNB-CU-Control Plane (CP).

Uplink (UL) PDCP configuration, i.e. how the UE uses the UL at the assisting node, is indicated via X2-C for EN-DC, Xn-C for NG-RAN and F1-C. Radio Link Outage/Resume for Downlink (DL) and/or UL is indicated via X2-U for EN-DC, Xn-U for NG-RAN and F1-U.

The NG-RAN is layered into a Radio Network Layer (RNL) and a Transport Network Layer (TNL). The NG-RAN architecture, i.e. the NG-RAN logical nodes and interfaces between them, is defined as part of the RNL.

For each NG-RAN interface NG, Xn, F1, the related TNL protocol and the functionality are specified. The TNL provides services for user plane transport, signalling transport.

In NG-Flex configuration, each NG-RAN node is connected to all Access and Mobility management Functions (AMF)s of AMF Sets within an AMF Region supporting at least one slice also supported by the NG-RAN node.

If security protection for control plane and user plane data on TNL of NG-RAN interfaces have to be supported, Network Domain Security NDS)/Internet Protocol (IP) 3GPP TS 33.501 shall be applied.

Overall Architecture for Separation of gNB-CU-CP and gNB-CU-UP

The overall architecture for separation of gNB-CU-CP and gNB-CU-User Plane UP) is depicted in FIG. 2

- A gNB may comprise a gNB-CU-CP, multiple gNB-CU-UPs and multiple gNB-DUs;
- The gNB-CU-CP is connected to the gNB-DU through the F1-C interface;
- The gNB-CU-UP is connected to the gNB-DU through the F1-U interface;
- The gNB-CU-UP is connected to the gNB-CU-CP through the E1 interface;
- One gNB-DU is connected to only one gNB-CU-CP;
- One gNB-CU-UP is connected to only one gNB-CU-CP;
- NOTE 1: For resiliency, a gNB-DU and/or a gNB-CU-UP may be connected to multiple gNB-CU-CPs by appropriate implementation.
- One gNB-DU may be connected to multiple gNB-CU-UPs under the control of the same gNB-CU-CP;
- One gNB-CU-UP may be connected to multiple DUs under the control of the same gNB-CU-CP;
- NOTE 2: The connectivity between a gNB-CU-UP and a gNB-DU is established by the gNB-CU-CP using Bearer Context Management functions.
- NOTE 3: The gNB-CU-CP selects the appropriate gNB-CU-UPs) for the requested services for the UE. In case of multiple CU-UPs they belong to same security domain.
- NOTE 4: Data forwarding between gNB-CU-UPs during intra-gNB-CU-CP handover within a gNB may be supported by Xn-U.

Dual Connectivity (DC)

Dual connectivity is generally used in NR and LTE systems to improve UE transmit and receive data rate. With DC, the UE typically initially operates with a serving cell group called a Master Cell Group (MCG). The UE is then configured by the network with an additional cell group called a Secondary Cell group (SCG). Each cell group (CG) may have one or more serving cells. MCG and SCG can be operated from geographically non-collocated gNBs. MCG and SCG can be operated with corresponding serving cells belonging to different frequency ranges and/or corresponding serving cells in same and different frequency ranges. In an example, an MCG can have serving cells in Frequency Range 1 (FR1) that including sub-6 GHz frequency bands, and SCG can also have serving cells in FR1.

3GPP Architecture Options

There are different ways to deploy 5G network with or without interworking with LTE and EPC, which is referred to as different options. In principle, NR and LTE may be deployed without any interworking, denoted by NR Stand-Alone SA) operation, that is gNB in NR may be connected to 5GC (Option 2) and eNB may be connected to EPC (Option 1) with no interconnection between the two.

On the other hand, the first supported version of NR is the so-called E-UTRAN-NR Dual Connectivity (EN-DC), (Option 3). In Option 3, a deployment, dual connectivity between NR and LTE is applied with LTE as a master node and NR as a secondary node. The RAN node (gNB) supporting NR, may not have a control plane connection to EPC, instead it relies on the LTE as Master node (MeNB). This is also referred to as Non-standalone NR. It should be noted that that in this case the functionality of an NR cell is limited and would be used for connected mode UEs as a booster and/or diversity leg, but an RRC_IDLE UE cannot camp on these NR cells, wherein RRC means Radio Resource Control.

With introduction of 5GC, other options may be also valid. As mentioned above, option 2 supports stand-alone NR deployment where gNB is connected to 5GC. Similarly, LTE may also be connected to 5GC using eLTE, E-UTRA/5GC, or LTE/5GC and the node may be referred to as an ng-eNB (Option 5). eLTE means that LTE is connected to 5GC. In these cases, both NR and LTE are seen as part of the NG-RAN and both the ng-eNB and the gNB can be referred to as NG-RAN nodes).

It is worth noting that, Option 4 and Option 7 are other variants of dual connectivity between LTE and NR which will be standardized as part of NG-RAN connected to 5GC, denoted by MR-DC Multi-Radio Dual Connectivity. The following is comprised under the MR-DC umbrella:

- EN-DC (Option 3): LTE is the master node and NR is the secondary EPC CN employed)
- NE-DC (Option 4): NR is the master node and LTE is the secondary 5GCN employed)
- NGEN-DC (Option 7): LTE is the master node and NR is the secondary 5GCN employed)
- NR-DC variant of (Option 2): Dual connectivity where both the master and secondary are NR 5GCN employed.

As the migration for these options may differ from different operators, it is possible to have deployments with multiple options in parallel in the same network e.g. there may be an eNB base station supporting option 3, 5 and 7 in the same network as an NR base station supporting option 2 and 4. In combination with dual connectivity solutions between LTE and NR it is also possible to support Carrier Aggregation (CA) in each cell group, i.e. Master Cell Group (MCG) and Secondary Cell Group (SCG), and dual connectivity between nodes on same RAT, e.g. NR-NR DC. For the LTE cells, a consequence of these different deployments is the co-existence of LTE cells associated to eNBs connected to EPC, 5GC or both EPC/5GC.

MR-DC User Plane Architecture

From a UE point of view, there are three Data Radio Bearer (DRB) types in MR-DC; MCG DRB, SCG DRB and split DRB, characterized by which cell group that is used for transmission, see FIG. 3. FIG. 3 depicts Radio Bearer types in MR-DC.

MCG DRB is only used in the MCG; SCG DRB is only used in the SCG, and the split DRB can be used in both of MCG and SCG for data transmission.

For any of or both of Radio Link Control (RLC) and Medium Access Control (MAC), a radio protocol version, E-UTRA or NR, may be selected based on the RAT used by the in the respective cell group. NR PDCP can be used for all DRB types except for in EN-DC wherein it is also possible to configure E-UTRA PDCP for the MCG DRB.

From a network node point of view, each respective DRB may have a termination point in either a Master Node (MN) or a Secondary Node (SN) such that six different bearer configurations are possible. For bearer configurations requiring data transmission over X2 or Xn interface, a flow control protocol can be used between the MN and the SN to avoid excessive buffering of data on the RLC bearer level. The RLC bearer may comprise respective configurations, RLC configuration or MAC configuration, for each logical channel towards the UE.

For Downlink (DL) transmission using split DRBs, the network such as a network node can decide per a PDCP Protocol Data Unit (PDU) whether to transmit via the MCG or the SCG. For Uplink (UL) transmission using split DRBs, the UE can instead be configured with a buffer threshold for each DRB. Thus, when data in the buffer for the corresponding DRB is below the associated buffer threshold, Buffer Status Reports (BSRs) is sent on a preferred path. The preferred path can be either the MCG or the SCG and may be configured by the network node for each respective DRB. In contrast, when data in the buffer may be above the buffer threshold, the UE reports the BSR to both MCG and SCG. In this way, a network scheduler using scheduling grants in the MCG and the SCG can control the uplink data flow based on the reported BSRs.

FIG. 4 illustrates the above termination point's options for MCG, SCG and split bearers in the MN and SN for MR-DC with EPC and EN-DC. FIG. 5 in illustrates the radio protocol termination options for MCG, SCG and split bearers in the MN and SN for MR-DC using 5GC. Furthermore, FIG. 5 also illustrates Quality of Service (QoS) Flows handled by the Service Data Adaptation Protocol (SDAP), which QoS Flows within PDU sessions are mapped by the SDAP to a corresponding Data Radio Bearer, and further ensures that packets of a specific QoS Flow correspond to the same QoS level.

MR-DC Control Plane Architecture

The UE in MR-DC has a single control plane connection to the core network and a single Radio Resource Control (RRC) state, e.g. controlled by the MN. Both the MN and the SN has its own respective RRC entity for creating RRC messages or Information Elements (IE) for configuring the UE. This is e.g. illustrated in FIG. 6, depicting the control plane architecture for EN-DC to the left and the control plane architecture of MR-DC with 5GC to the right.

As the SN may be responsible for its own resources, it may provide the UE with the SCG configuration in an RRC message. The SN may further provide to the UE, the radio bearer configuration in an IE, for all bearers that have a termination point in the SN. The MN may in turn create the Master Cell Group (MCG) configuration and the radio bearer configuration for all bearers with a termination point in the MN. The cell group configuration may include the configuration of the L1 physical layer, MAC and RLC. The radio bearer configuration may include the configuration of PDCP. For e.g. 5GC, SDAP configuration may also be included in the radio bearer configuration.

The MN sends the initial SN RRC configuration via MCG SRB, e.g. SRB1, but subsequent RRC configurations created by the SN may be sent to the UE either via the MN, e.g. using SRB1, or directly to the UE e.g. using SRB3. See FIG. 7 for the different SRB types.

For the SRB1 case, the MN may receive from the SN, an RRC message comprising the SCG configuration and an IE comprising the radio bearer configuration. The MN may further generate an RRC message to encapsulate the SCG configuration and the IE into. The RRC message may also include changes to the MCG configuration and radio bearer configuration of bearers with a termination point in the MN. In this way, the respective MCG and SCG configurations may be sent to the UE in the same RRC message.

A split SRB1 may use to create diversity. From an RRC point of view, the split SRB1 may operate like a normal SRB1, however, on PDCP level, the sender may decide to either choose a leg, e.g. in the MCG leg or in the SCG leg, for scheduling the RRC messages, or duplicate the message over both legs. For DL or UL, the network node may thus configure the UE to use the MCG, SCG or both legs. The terms "leg", "path" and "RLC bearer" are used interchangeably throughout this document.

For the SRB3 case, the SN may generate the RRC message including the SCG configuration and the radio bearer configuration for radio bearers with termination point in the SN. The SN may use SRB3 for reconfigurations not requiring coordination with the MN.

Termination point options for protocols using above SRBs in MR-DC are further illustrated in FIG. 7.

RRC Security Mechanisms

RRC Integrity Mechanisms

RRC integrity protection may be provided by the PDCP layer between UE and the network node wherein no layers below PDCP may be integrity protected. Replay protection may be activated when integrity protection is activated except for e.g. when the selected integrity protection algorithm is NIA0, which provides no protection. Replay protection may ensure that a receiver accepts each particular incoming PDCP counter value, e.g. PDCP COUNT, only once using the same Access Stratum (AS) security context.

RRC Confidentiality Mechanisms

RRC confidentiality protection may be provided by the PDCP layer between UE and the network node. The input parameters to the 128-bit NEA algorithms are a 128-bit cipher Key KRRCenc as KEY, a 5-bit bearer identity, referred to as BEARER, which corresponds to the radio bearer identity, the 1-bit direction of transmission, referred to as DIRECTION, the length of the keystream required, referred to as LENGTH, and a bearer specific direction dependent 32-bit input referred to as COUNT, which corresponds to the 32-bit PDCP COUNT.

UP Security Mechanism

UP Security Activation

AS UP integrity protection and security protection activation may be performed as part of the DRB addition procedure using the RRC Connection Reconfiguration procedure as disclosed below and illustrated in FIG. 8. FIG. 8 depicts an example UP security activation mechanism comprising the following mentioned steps between a UE and a network node, e.g. an gNB or an NG-eNB, labelled gNB/ng-eNB in FIG. 8.

A Session Management Function (SMF) may send the UP security policy to the gNB or a NG-eNB.

FIG. 8 step 1a. The RRC Connection Reconfiguration procedure used to add DRBs may be performed after RRC security has been activated as part of the AS security mode command procedure. The precondition for the following actions may thus be that RRC security is activated, i.e., RRC ciphering and RRC integrity protection are activated.

FIG. 8 step 1b. The network node sends an RRC Connection Reconfiguration message to the UE for UP security activation comprising indications for the activation of UP integrity protection and ciphering for each DRB according to the security policy.

FIG. 8 step 1c. For each DRB, if UP integrity protection is activated, e.g. as indicated in the RRC Connection Reconfiguration message, and if the network node does not have an UP integrity User Plane key, $K_{UPint}$, the network node may generate the $K_{UPint}$ and UP integrity protection e.g. for the DRBs which may start at the network node. Similarly, for each DRB, if UP ciphering is activated, e.g. as indicated in the RRC Connection Reconfiguration message, and the network node does not have an UP encryption key, $K_{UPenc}$, generated $K_{UPenc}$ and start uplink UP deciphering and downlink UP ciphering e.g. for the DRBs which may start at the network node.

FIG. 8 step 2a. The UE verifies the RRC Connection Reconfiguration message integrity. If successful, for each DRB, if UP integrity is activated, the UE starts uplink UP integrity protection and downlink UP integrity verification. Furthermore, for each DRB, if ciphering is activated, the UE starts uplink UP ciphering and downlink UP deciphering, and sends RRC Connection Reconfiguration complete. Furthermore, if UP integrity protection is activated for DRBs as indicated in the RRC Connection Reconfiguration message, and if the UE does not have the $K_{UPint}$, the UE may generate the $K_{UPint}$ and UP integrity protection e.g. for DRBs which may start at the UE. Similarly, if UP ciphering is activated for DRBs as indicated in the RRC Connection Reconfiguration message, and if the UE does not have the $K_{UPenc}$, the UE may generate $K_{UPenc}$ and UP ciphering e.g. for DRBs which may start at the UE.

FIG. 8 step 2b. If the UE successfully verifies the integrity of the RRC Connection Reconfiguration message, the UE may thus send the RRC Connection Reconfiguration Complete message to the network node. If UP integrity protection is not activated for DRBs, the network node and the UE may not integrity-protect the traffic of such DRB and may not put the MAC Integrity (MAC-I) field into PDCP packet. If UP ciphering is not activated for DRBs, the network node and the UE may not security-protect, e.g. cipher, the traffic of such DRBs.

UP Confidentiality Mechanisms

The PDCP protocol between the UE and the NG-RAN is responsible for user plane data confidentiality protection. The use and mode of operation of the 128-bit NEA algorithms are further specified in Annex D.

The input parameters to the 128-bit NEA algorithms may be the message packet, an 128-bit cipher key $K_{UPenc}$ as a key, a 5-bit bearer identity which value may be assigned as specified by TS 38.323, a 1-bit direction of transmission, a length of the keystream, and a bearer specific, and direction dependent 32-bit input counter, which may correspond to the 32-bit PDCP counter, e.g. PDCP COUNT.

UP Integrity Mechanisms

The PDCP protocol between the UE and the NG-RAN, as specified in 3GPP TS 38.323 is responsible for UP data integrity protection.

The input parameters to the 128-bit NIA algorithms used for integrity-protection may be, the message packet, a 128-bit integrity $K_{UPint}$ key, a 5-bit bearer value which may assigned as specified by 3GPP TS 38.323 a 1-bit direction of transmission, and a bearer specific, and direction dependent 32-bit input counter, which may correspond to the 32-bit PDCP counter, e.g. PDCP COUNT.

If the network node or the UE receives a PDCP PDU, which fails integrity check with e.g. a faulty or missing MAC-I after the start of integrity protection, the PDU may be discarded.

Security in DC

Dual Connectivity Protocol Architecture for MR-DC with 5GC

When the MN establishes an initial security context between the SN and the UE for the for a given AS security context shared between the MN and the UE, the MN generates a security key, $K_{SN}$, for the SN and sends it to the SN over the Xn-C interface. To generate the $K_{SN}$, the MN associates a counter with the current AS security context. The counter may e.g. be an SN Counter or a Secondary Key (SK) counter. The counter may further be used for updating the $K_{SN}$. The MN then sends the value of the SN Counter to the UE over the RRC signaling path when the MN decides to generate a new $K_{SN}$. The $K_{SN}$ is then used to derive further RRC and UP keys that are used between the UE and SN.

Security Mechanisms and Procedures for DC

SN Addition or Modification

When the MN is executing the Secondary Node Addition procedure, i.e. initial offload of one or more radio bearers to the SN, or the Secondary Node Modification procedure which requires an update of the KSN, the MN shall derive an KSN. The MN shall maintain the SN Counter.

When executing the procedure for adding subsequent radio bearer(s) to the same SN, the MN shall, for each new radio bearer, assign a radio bearer identity that has not previously been used since the last $K_{SN}$ change. If the MN cannot allocate an unused radio bearer identity for a new radio bearer in the SN, due to radio bearer identity space exhaustion, the MN shall increment the SN Counter and compute a fresh $K_{SN}$, and then shall perform a SN Modification procedure to update the $K_{SN}$.

The dual connectivity procedure with activation of security-protection using encryption and decryption and integrity protection comprises the following steps outlined in FIG. 9 concerning an example relating to security aspects in SN Addition and Modification procedures initiated by the MN.

FIG. 9 step 1. The UE and the MN establish the RRC connection.

FIG. 9 step 2. The MN sends an SN Addition or SN Modification Request to the SN over the Xn-C to negotiate available resources, configuration, and algorithms at the SN. The MN further computes and delivers the $K_{SN}$ to the SN if a new key is needed. The UE security capabilities and the UP security policy received from the SMF is also sent to SN from the MN. In case of a PDU split, UP integrity protection and security protection activation decision from MN may also be included.

FIG. 9 step 3. The SN allocates the necessary resources, and further selects the ciphering algorithm and integrity algorithm which has the highest priority from its configured list and is also present in the UE security capability. If a new $K_{SN}$ was delivered to the SN, then the SN calculates the needed RRC. The UP keys may be derived at the same time when RRC key derived. The SN shall activate the UP security policy.

FIG. 9 step 4. The SN sends an SN Addition or SN Modification Acknowledge to the MN indicating availability of the requested resources and the identifiers for at least one selected algorithm for the requested DRBs, SRB, or both. The UP integrity protection and encryption indications shall be sent to the MN.

FIG. 9 step 5. The MN sends the RRC Connection Reconfiguration Request to the UE instructing it to configure new DRBs, SRB, or both for the SN. The MN shall include the SN Counter parameter to indicate a new KSN is needed. The UE shall compute the $K_{SN}$ for the SN. The MN forwards the UE configuration parameters which contains the algorithm identifier(s) received from the SN, and UP integrity protection and encryption indications, to the UE.

NOTE 3: Since the message may be sent over the RRC connection between the MN and the UE, it is integrity protected using the $K_{RRCint}$ of the MN. Hence, the SN Counter cannot be tampered with.

FIG. 9 step 6. The UE accepts the RRC Connection Reconfiguration Request after validating its integrity. The UE shall compute the $K_{SN}$ for the SN if an SN Counter parameter was included. The UE shall also compute the needed RRC and UP keys and activate the UP protection as per the indications received for the associated DRBs, SRB, or both. The UE sends the RRC Reconfiguration Complete to the MN. The UE may activate selected encryption, and integrity protection with the SN at this point.

FIG. 9 step 7. MN sends SN Reconfiguration Complete to the SN over the Xn-C to inform the SN of the configuration result. On receipt of this message, the SN may activate selected encryption and integrity protection with the UE. If the SN does not activate encryption protection and integrity protection with the UE at this stage, the SN shall activate encryption and integrity protection upon receiving the random access request from the UE.

Secondary Node Key Update

The SN shall request the MN to update the $K_{SN}$ over the Xn-C, when uplink and/or downlink PDCP COUNT is about to wrap around, e.g. by integer overflow in the 32 bit PDCP counter for any of the SCG DRBs or SCG SRB.

If the MN re-keys its currently active AS key in an 5G AS security context the MN shall update any KSN associated with that 5G AS security context.

Whenever the UE or SN start using a fresh KSN, they shall re-calculate the RRC and UP keys from the fresh KSN.

MN Initiated Update

The MN may update the $K_{SN}$ for any reason. If the MN decides to update the $K_{SN}$, the MN shall perform an SN modification procedure to deliver the fresh KSN to the SN. The MN shall provide the value of the counter, e.g. SN counter, used in the derivation of the KSN, to the UE in an integrity protected RRC Connection Reconfiguration procedure.

SN Initiated Update

When, e.g. uplink and/or downlink PDCP COUNTs, are about to wrap around for any of the SCG DRBs or SCG SRB, the SN shall request the MN to update the $K_{SN}$ over the Xn-C using the SN Modification procedure with MN involvement as illustrated in the following steps in FIG. 10. The SN shall send the SN Modification Required message including $K_{SN}$ key update and indication to the MN as shown in FIG. 10 step 1. When the MN receives $K_{SN}$ Key update indication, the MN shall derive a fresh $K_{SN}$ and send the derived $K_{SN}$ to the SN in the SN Modification Request message as in FIG. 10 step 2. The following steps follow similar steps as illustrated by FIG. 9.

SN Release and Change

When the SN releases the last UE radio bearer on the SN or when the SN is changed, i.e. the UE radio bearers are moved from the SN, the SN and the UE may delete the SN RRC and UP keys. The SN and UE shall further delete the $K_{SN}$, if it was not deleted earlier.

Establishing the Security Context Between UE and SN

SN Counter Maintenance

The MN shall maintain a 16-bit counter, SN Counter, in its AS security context. The SN Counter is used when computing the $K_{SN}$.

The MN maintains the value of the SN Counter for a duration of the current 5G AS security context between the UE and the MN. The UE does not need to maintain any counter after it has computed the $K_{SN}$ since the MN provides the UE with the current counter value when the UE needs to compute a new $K_{SN}$.

The SN Counter is a fresh input to $K_{SN}$ derivation since the UE assumes that the MN provides a fresh SN Counter each time and does not need to verify the freshness of the counter.

It should be noted that an attacker cannot, over the air, modify the counter and force re-use of the same counter. The reason for this is that the SN counter, may be delivered over the RRC connection between the MN and the UE, which connection may be both integrity protected and protected from replay.

The MN shall set the SN counter, value to '0' when a new AS root key, KNG-RAN, in the associated 5G AS security context is established. The MN shall set the SN counter to '1' after the first calculated $K_{SN}$, and monotonically increment it for each additional calculated $K_{SN}$. The SN counter value '0' is initially used to calculate the first $K_{SN}$.

If the MN decides to release offloaded connections to the SN and later decides to re-start the offloading to the same SN, the counted value shall keep increasing, thus keeping the computed $K_{SN}$ fresh.

The MN shall refresh the root key of the 5G AS security context associated with the SN Counter before the SN Counter wraps around. Refreshing the root key is then performed using intra cell handover. When the root key is refreshed, the SN Counter is reset to '0' as defined above.

Derivation of Keys

The UE and the MN shall derive the security key $K_{SN}$ of the SN. When all the SN RRC and UP keys have been derived from the $K_{SN}$, the SN and UE may then delete the $K_{SN}$.

Negotiation of Security Algorithms

The MN shall receive the UE security capabilities from the AMF or the previous NG-RAN node. These security capabilities include both LTE and NR security capabilities.

When establishing one or more DRBs, SRBs, or both for a UE at the SN, the MN shall provide UE security capabilities to the SN in the SN Addition and/or Modification Request message.

Upon receipt of the message the SN shall select the algorithms with highest priority in its locally configured list of algorithms that are also present in the received UE security capabilities. The selected algorithms are included in an SN Addition and/or Modification Request Acknowledge.

The MN shall provide the selected algorithms to the UE during the RRC Connection Reconfiguration procedure configuring the DRBs and/or SRB with the SN for the UE. The UE shall use the indicated algorithms for the DRBs and/or SRB with the SN. The UE shall use the indicated algorithms for the DRBs and/or SRB whose PDCP terminates on the SN.

The algorithms that the UE uses with the MN can be the same or different as the algorithms used with the SN.

Handover Procedure

During N2 and Xn handover, the DRB and/or SRB connections between the UE and the SN shall be released. The SN and the UE shall delete the SN RRC and UP keys since they shall be refreshed by the new $K_{SN}$ derived by a target MN.

Integrated Access Backhaul Networks

3GPP is currently standardizing Integrated Access and Wireless Access Backhaul (IAB) in NR in Release 16, 3GPP RP-193251.

The usage of short-range mmWave spectrum in NR creates a need for a densified deployment with multi-hop backhauling. However, optical fiber to every base station will be too costly and sometimes not even possible, e.g. at historical sites. An IAB principle is the use of wireless links for the backhaul instead of fiber. This enables a flexible and very dense deployment of cells without the densifying the transport network. Use case scenarios for IAB includes coverage extension, deployment of massive number of small cells and Fixed Wireless Access (FWA), e.g. to residential or office buildings. The increased bandwidth available for NR in the mmWave spectrum provides an opportunity for selfbackhauling, without limiting the spectrum to be used for the access links. Furthermore, the inherent multi-beam and MIMO support in NR reduces any cross-link interference between the backhaul and access links, which thus allow a higher densification.

During the study item phase of the IAB work, it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part that they use to communicate with their parent nodes.

The specifications for IAB strives to reuse existing functions and interfaces already defined in NR. In particular, MT, gNB-DU, gNB-CU, User Plane Function (UPF), AMF and SMF as well as the corresponding interfaces such as the NR Uu interface between MT and gNB, and furthermore the F1, NG, X2 and N4 interfaces which are all used as baseline for IAB architectures. It should be noted that the gNB-DU is also referred to as a DU node and the gNB-CU is also referred to as a CU node. Further the wordings DU and DU node and can be used interchangeably herein, and similar, the wordings CU and CU node can be used interchangeably herein.

The Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 11 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated. Some of the functions presently associated with the IAB-donor can be moved outside of the donor in case they do not perform IAB-specific tasks.

The baseline user plane and control plane protocol stacks for IAB are shown in the FIG. 12 and FIG. 13. FIG. 12 depicts a Baseline User Plane Protocol stack for IAB in release 16, and FIG. 13 depicts a Baseline CP Protocol stack for IAB in release 16.

The full user plane and control plane protocol stacks illustrated in FIGS. 12 and 13 both reuse the CU-DU split as specified release 15. The full user plane F1-U comprises General Packet Radio Service Tunneling Protocol for user data (GTP-U), User Datagram Protocol (UDP), and IP is terminated at the IAB node. The full control plane F1-C comprises F1 Application Protocol (F1-AP), Stream Control Transmission Protocol (SCTP), and IP. Both the full user plane and control plane terminates at the IAB node. Furthermore, Network Domain Security (NDS) is employed to protect both UP and CP traffic. IP security (IPsec) is used for protecting the UP, and Datagram Transport Layer Security (DTLS) is used for protecting the CP. IPsec can also be used for protecting the CP instead of DTLS in this case no DTLS layer is used.

A new protocol layer called Backhaul Adaptation Protocol (BAP) has been introduced in the IAB nodes and the IAB donor, which is used to route packets to an appropriate downstream or upstream node. To satisfy the end-to-end QoS requirements of bearers, BAP also maps UE bearer data to a proper backhaul RLC channel. Furthermore, BAP also maps between ingress and egress backhaul RLC channels in intermediate IAB nodes.

SUMMARY

As a part of developing embodiments herein the inventors identified a problem which first will be discussed.

As described above, in the CU-DU protocol architecture, the RRC and/or PDCP is terminated at the CU, while the DU terminates the lower layers such as RLC, MAC and/or PHY. A reason behind this decision is security. In the split architecture, it is assumed that the CU will be located and/or deployed in a physically secure location, while DUs do not necessarily have to, enabling deployment flexibility. Terminating the PDCP and/or RRC at the CU will ensure that no physical tampering could be made by attackers and security keys, UE contexts, etc. will be safe. It is so because PDCP layer is the security termination layer, i.e., the layer that handles security among other things. Even if attackers get hold of the DU, all they will be able to access is RLC PDUs, which already contained encrypted and/or integrity-protected user plane and control plane data.

One shortcoming with such approach is that most major decisions about the UE's connections are made by the CU-CP. Take an example for control plane messages. Measurements, e.g., radio conditions, have to be sent to the CU-CP, which may decide to change something about the UE's connection, e.g. start and/or stop duplication of data of some bearers, change cells, add cells, etc. In scenarios like multi-hop IAB networks, this means that the measurements have to travel several hops to reach the CU-CP, and then the reconfiguration message that was decided based on these measurements have also to traverse several hops to reach the UE before the measurements are used. Take another example for user plane messages. All the data traffic, e.g., downloading a video or uploading a picture to and/or from an Internet server, has to travel up and/or down via multiple hops to/from CU-UP.

The problem with travelling up and/or down via multiple hops is that the latency introduced in doing so does not allow DU to take actions quickly.

An object of embodiments herein is to provide improved security for messages in a CU-DU split architecture of a wireless communications network.

According to an aspect, the object is achieved by a method performed by a DU node for handling a message in a communication between a UE, the DU node, and a CU node in a wireless communications network. The DU node obtains a secondary security key from a network node. The secondary security key is associated with the DU node. The DU node receives the message from any one out of: the UE and the CU node. The message is security protected with any one or more out of: a first security key, and the secondary security key. The message, or part of the message, is not possible to use by the DU node when security protected with the first security key. The DU node determines that at least a part of the message is security protected with the secondary security key. The DU node security processes said at least the part of the message security protected with the secondary security key. The DU node then takes actions related to the communication based on information in the security processed message.

According to another aspect, the object is achieved by a method performed by a UE for handling a message in a communication between the UE, a DU node, and a CU node in a wireless communications network. The DU node obtains a first security key associated with the CU node, and a secondary security key associated with the DU node, wherein a message security protected with the first security key is not possible to use by the DU node. The DU node determines which one out of the first security key and the secondary security key that is to be used for at least a part of a message, for security protection. The DU node determines that the secondary security key is used for at least a part of the message for security protection. The DU node then communicates the message with the DU node, wherein at least part message is security protected with the secondary security key. The security protection with the secondary security key enables the DU node to security process said at least the part of the message, and take actions related to the communication based on information in the security processed message.

According to another aspect, the object is achieved by a DU node configured to handle a message in a communication between a UE, the DU node and a CU node in a wireless communications network. The DU node is further configured to:

Obtain a secondary security key from a network node, which secondary security key is adapted to be associated with the DU node,
  receive the message from any one out of: the UE and the CU node, which message is adapted to be security protected with any one or more out of: a first security key, and the secondary security key, which message or part of message is arranged to not be possible to use by the DU node when security protected with the first security key,
  determine that at least a part of the message is security protected with the secondary security key,
  security process said at least the part of the message security protected with the secondary security key, and
  take actions related to the communication based on information in the security processed message.

According to another aspect, the object is achieved by a UE configured to handle a message in a communication between the UE, a DU node, and a CU node in a wireless communications network. The UE is further configured to:

Obtain a first security key adapted to be associated with the CU node, and a secondary security key adapted to be associated with the DU node, wherein a message security protected with the first security key is arranged to not be possible to use by the DU node,
  determine which one out of the first security key and the secondary security key that is to be used for at least a part of a message, for security protection, and
  when determining that the secondary security key is used for at least a part of a message for security protection, communicate the message with the DU node, wherein at least part message is arranged to be security protected with the secondary security key,
  wherein the security protection with the secondary security key is adapted to enable the DU node to security process said at least the part of the message, and take actions related to the communication based on information in the security processed message.

BRIEF DESCRIPTION OF THE DRAWINGS

Examples of embodiments herein are described in more detail with reference to attached drawings in which:
FIG. 16 is a flowchart depicting embodiments of a method in a UE.
FIGS. 21 to 24 are flowcharts illustrating methods implemented in a communication system including a host computer, a base station and a user equipment.

DETAILED DESCRIPTION

An example of embodiments herein relates to security enhancements for messages in a CU-DU split architecture.

Example embodiments herein provide different mechanisms for enabling a DU in a CU-DU split architecture, with appropriate security information, enabling the DU to process at least some parts of control plane and user plane messages and make local decisions, without necessarily involving the CU-CP and CU-UP each time.

Some example embodiments are to apply the DC security principles for the CU-DU architecture. That is, even though the UE is in single connectivity, it may be configured with a secondary security key, referred to as $K_{du}$ or KgNB-alternate. Some RRC messages are encrypted and/or integrity protected using this secondary security key while other messages use the primary and/or master key, also referred to as first security key. The DU will then be able to process part of messages that are encrypted and/or integrity protected using the secondary security keys derived from $K_{du}$ and is thus enabled to make local decisions.

Advantages of embodiments herein e.g. comprise the following:

With the provided mechanisms, a DU is enabled to have more functionality than just to transparently forward CP and UP data between the UE and the CU-UP/CU-CP. The DU will be able to process some of the CP/UP messages passing through it and is thus enabled to make some decisions on its own instead of forwarding every message to and/or from the CU and waiting for a command from the CU. This makes the processing of the CP/UP messages with appropriate security information faster and the decisions taken may be more up to date and relevant.

In the CP, the DU is enabled to process CP messages like measurement reports and to change some of the behaviour of the connection to the UE, such as e.g. enabling and/or disabling duplication, changing other configurations associated with the UE's DL connection, etc.

In the UP, the DU is enabled to perform some local decisions on how to handle some bearers. For example, the DU may be configured such that that some UL UP data should be locally routed instead of being forwarded to the CU. The DU may then integrity-verify and decrypt the UP data and may forward it directly to the configured destination. That way, some UP processing is offloaded from the CU-UP to the DU. For some extremely latency tolerant services, this may be desirable to reduce the UP latency as much as possible.

Figure 1:
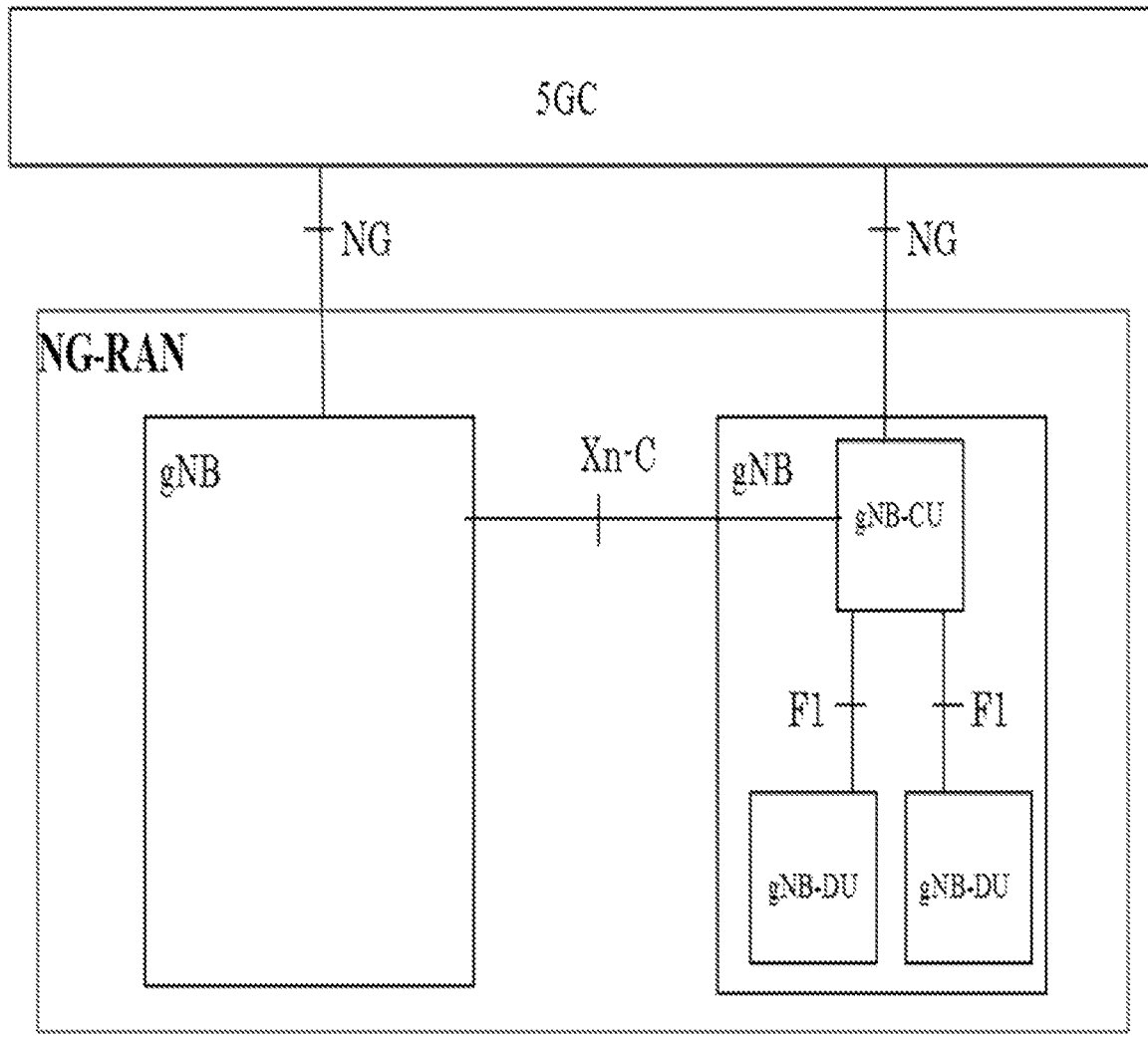
FIG. 1 is a schematic block diagram illustrating prior art.
Figure 2:
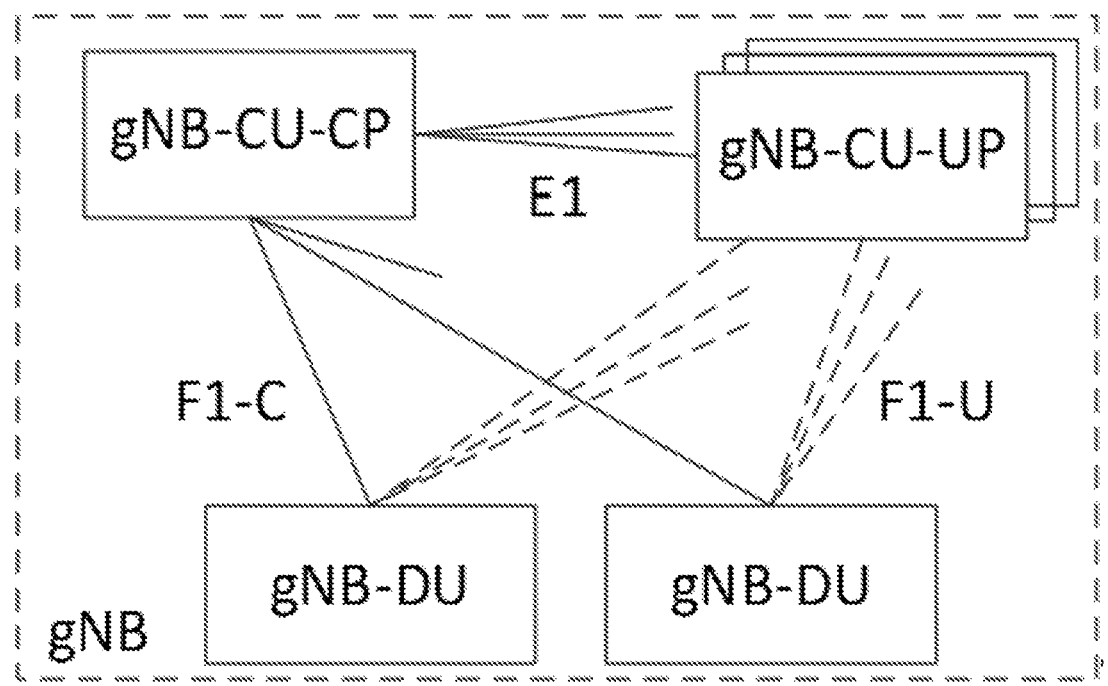
FIG. 2 is a schematic block diagram illustrating prior art.
Figure 3:
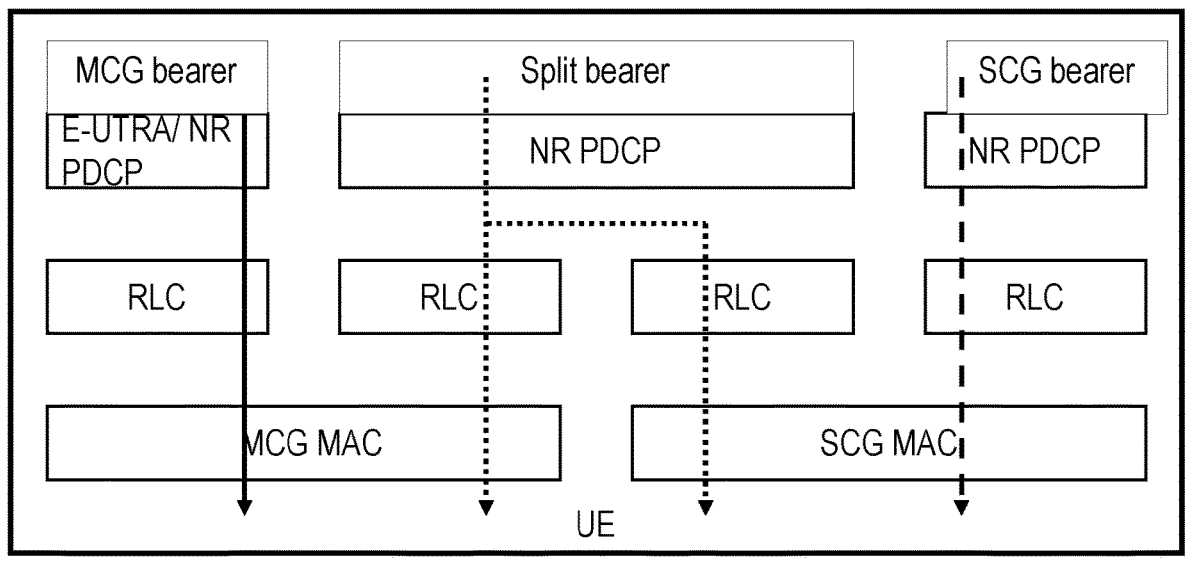
FIG. 3 is a schematic block diagram illustrating prior art.
Figure 4:
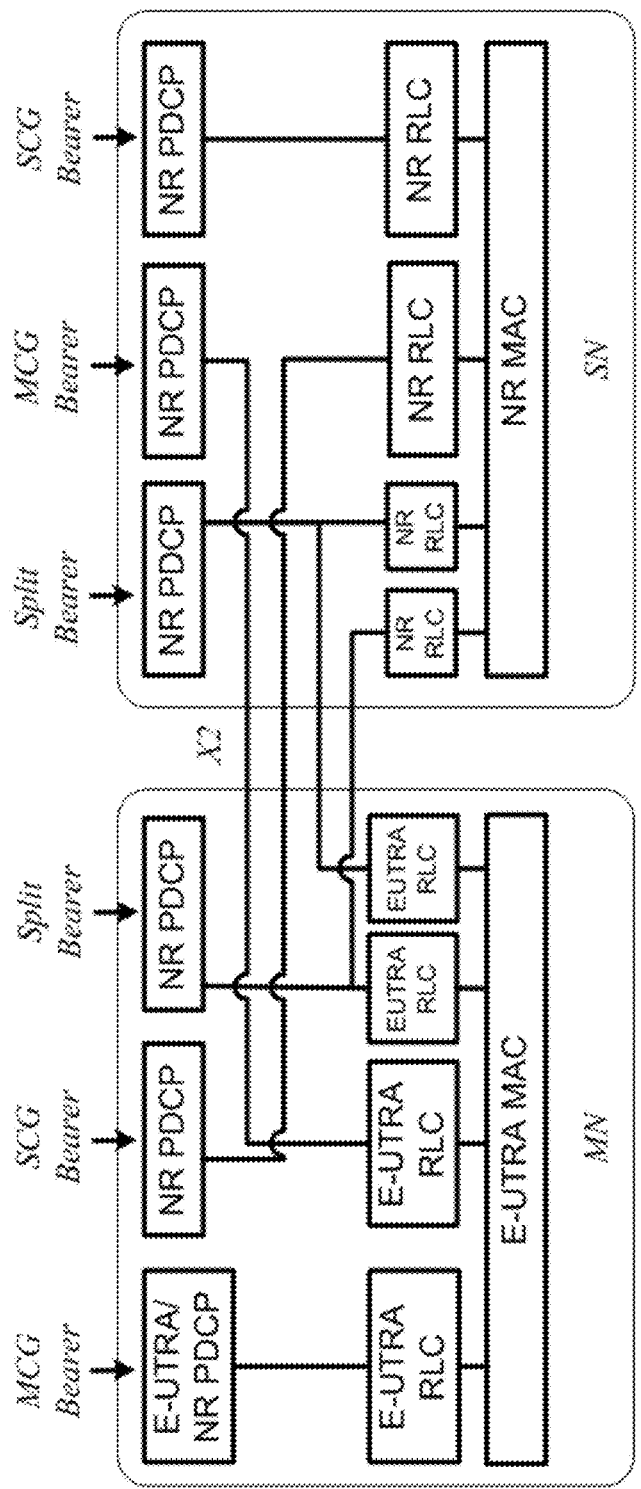
FIG. 4 is a schematic block diagram illustrating prior art.
Figure 5:
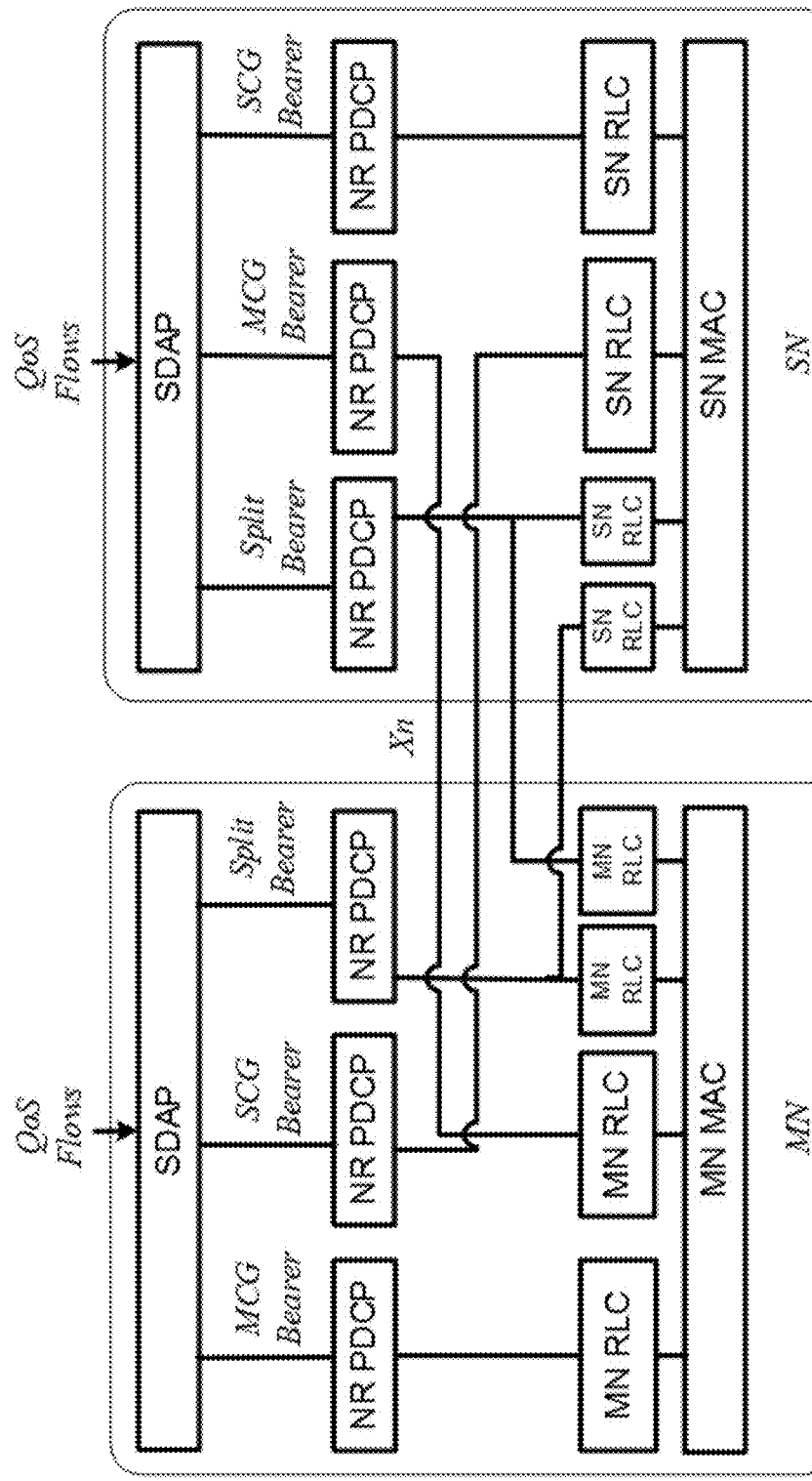
FIG. 5 is a schematic block diagram illustrating prior art.
Figure 6:
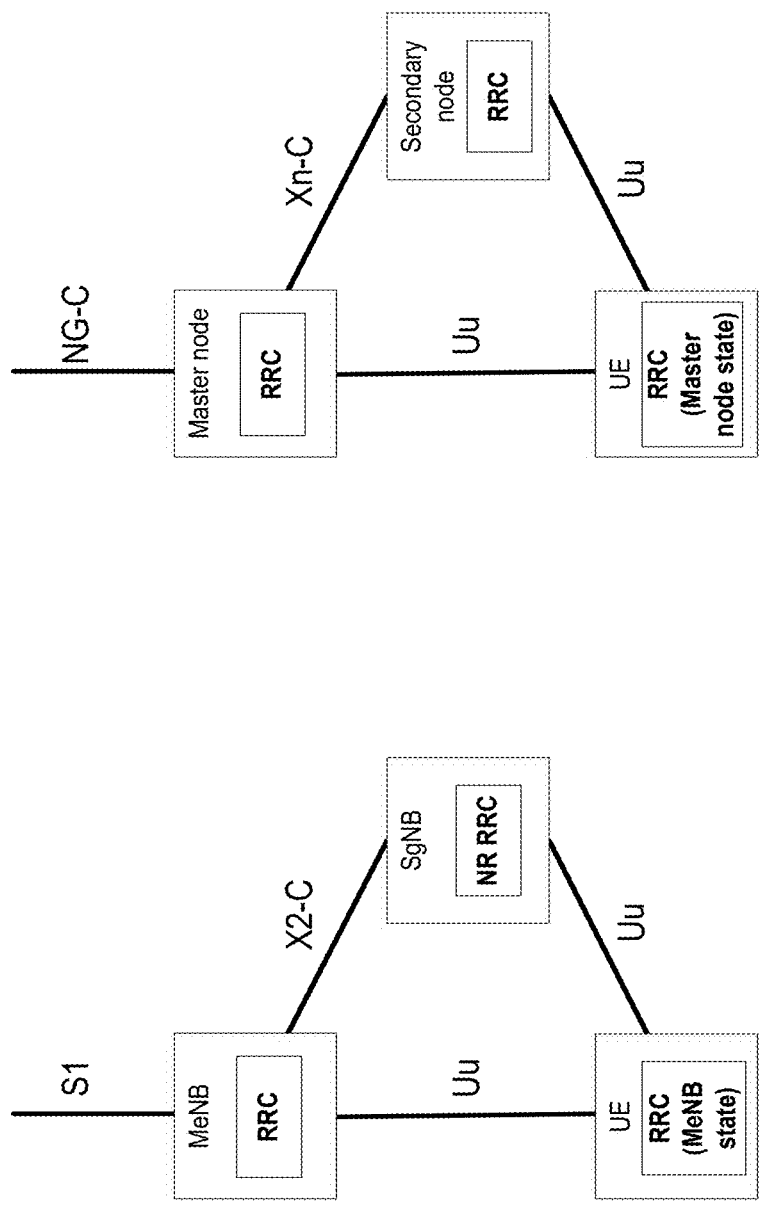
FIG. 6 is a schematic block diagram illustrating prior art.
Figure 7:
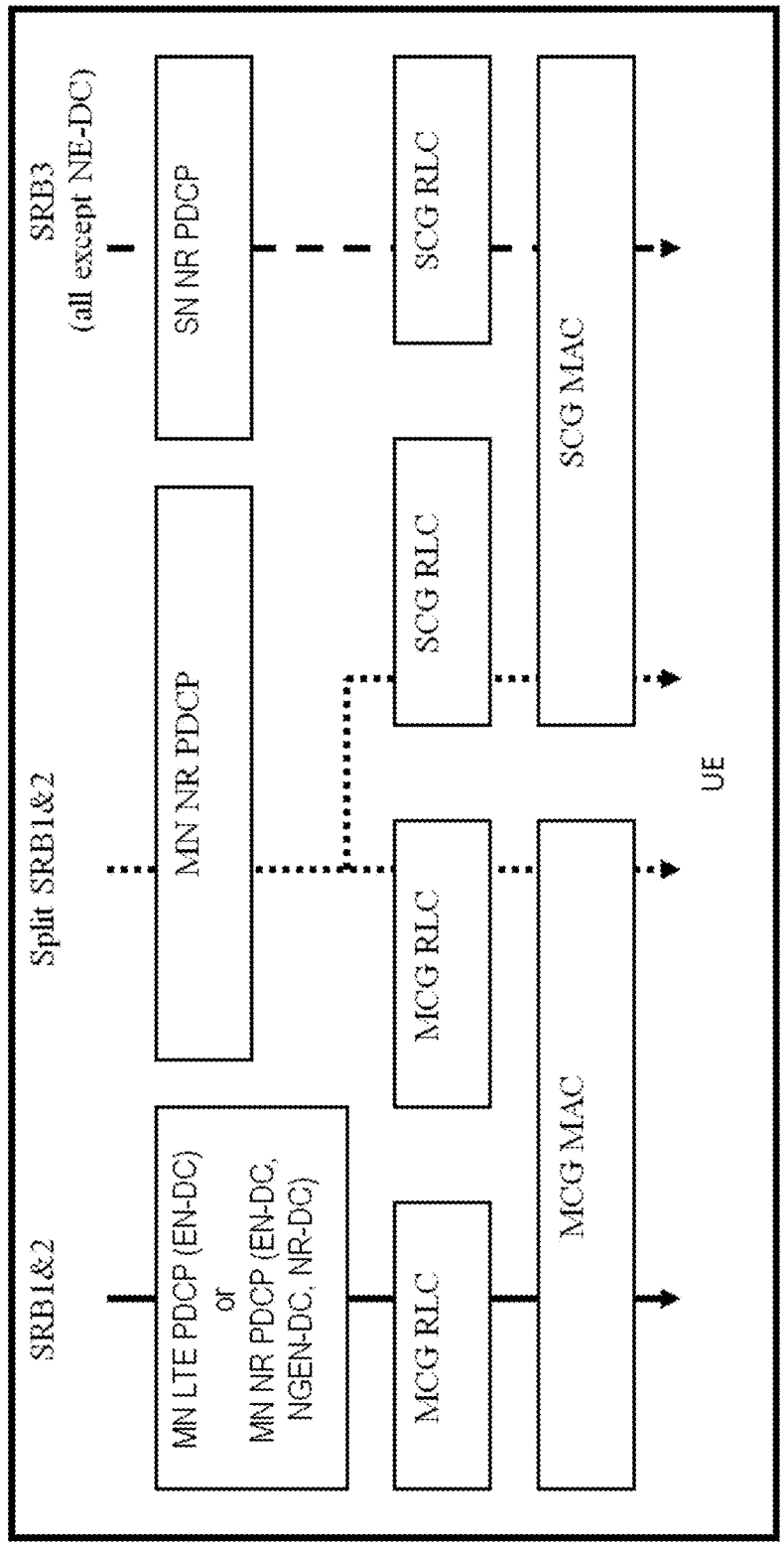
FIG. 7 is a schematic block diagram illustrating prior art.
Figure 8:
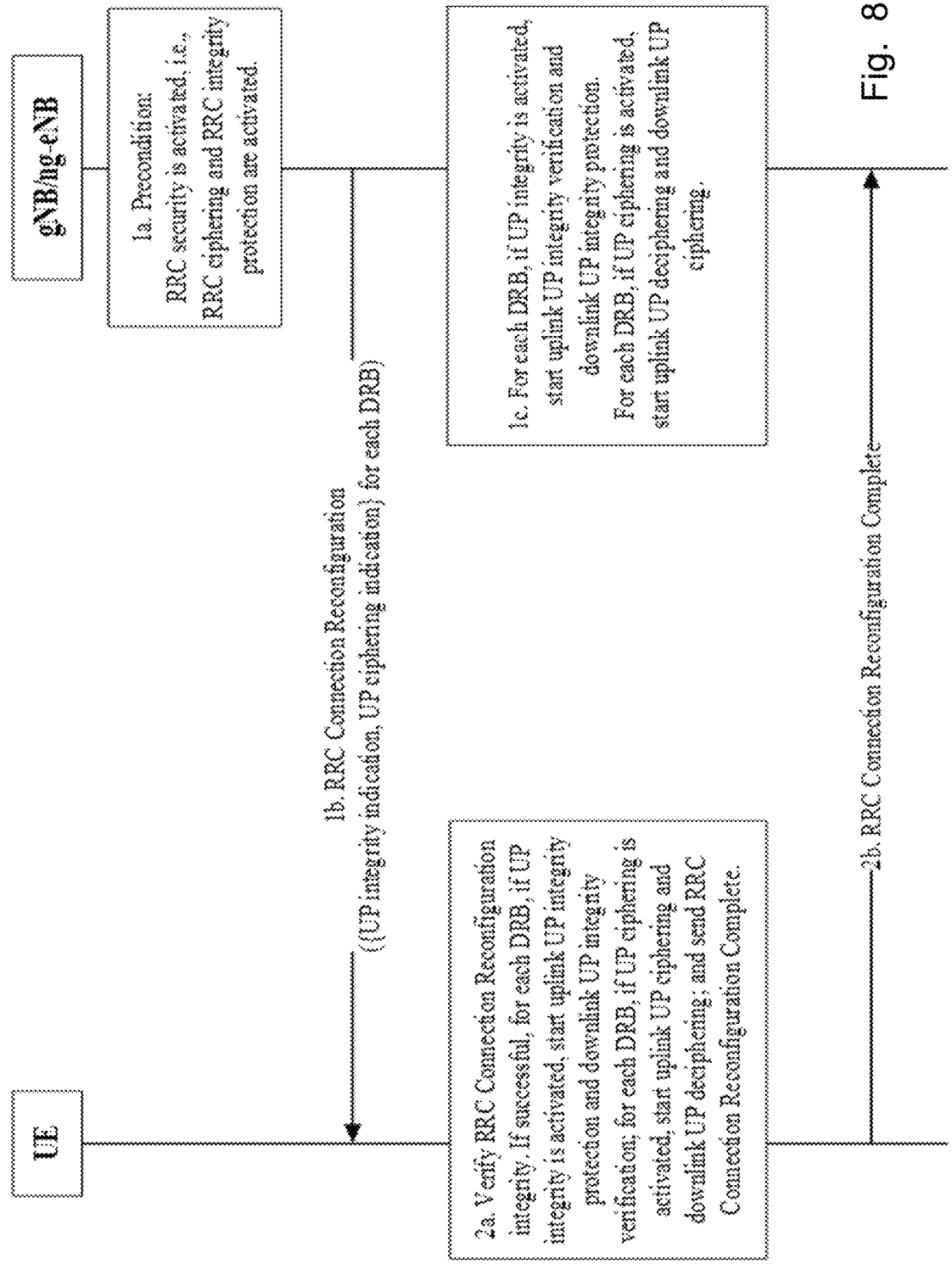
FIG. 8 is a combined flowchart and signaling scheme illustrating prior art.
Figure 9:
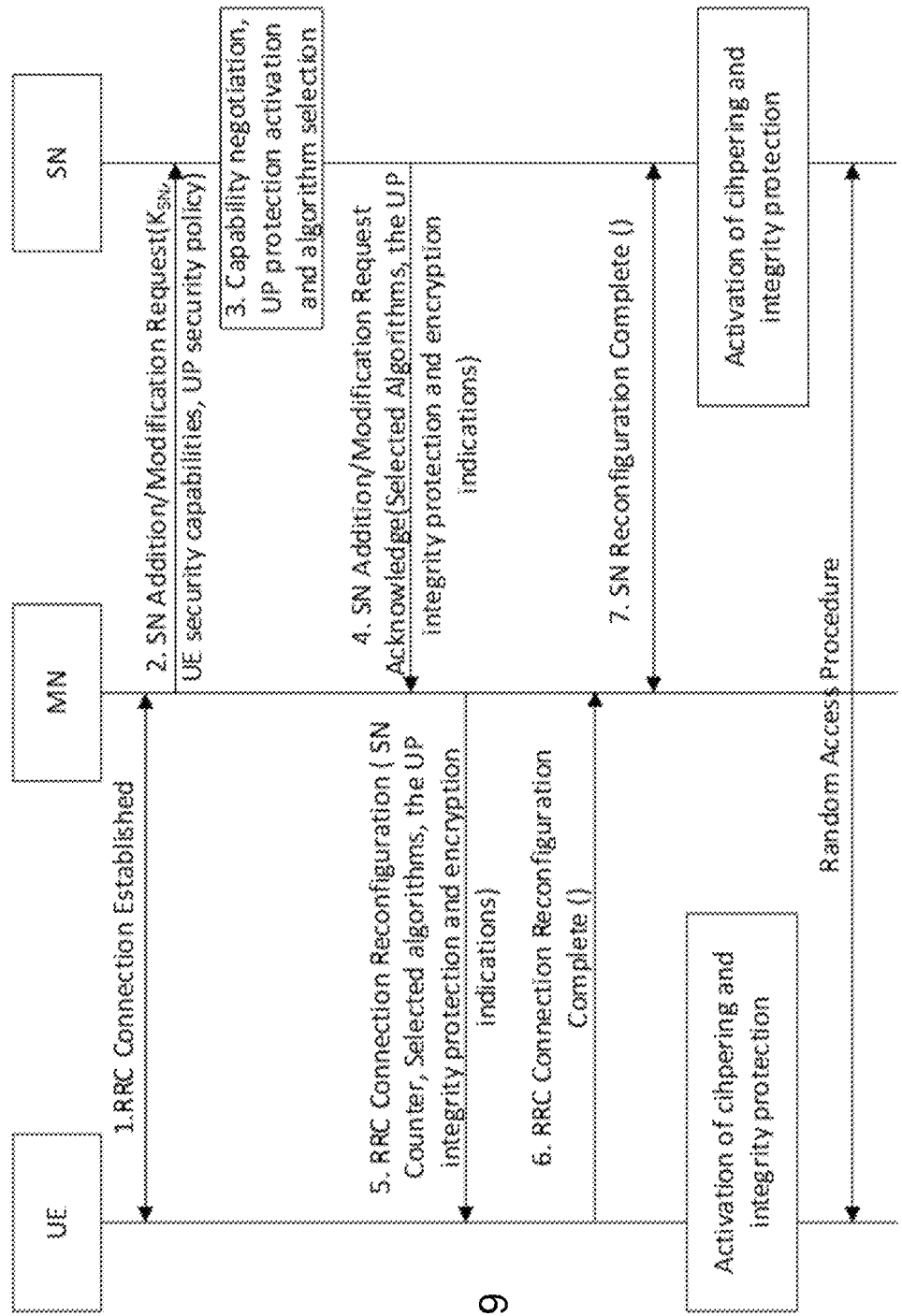
FIG. 9 is a combined flowchart and signaling scheme illustrating prior art.
Figure 10:
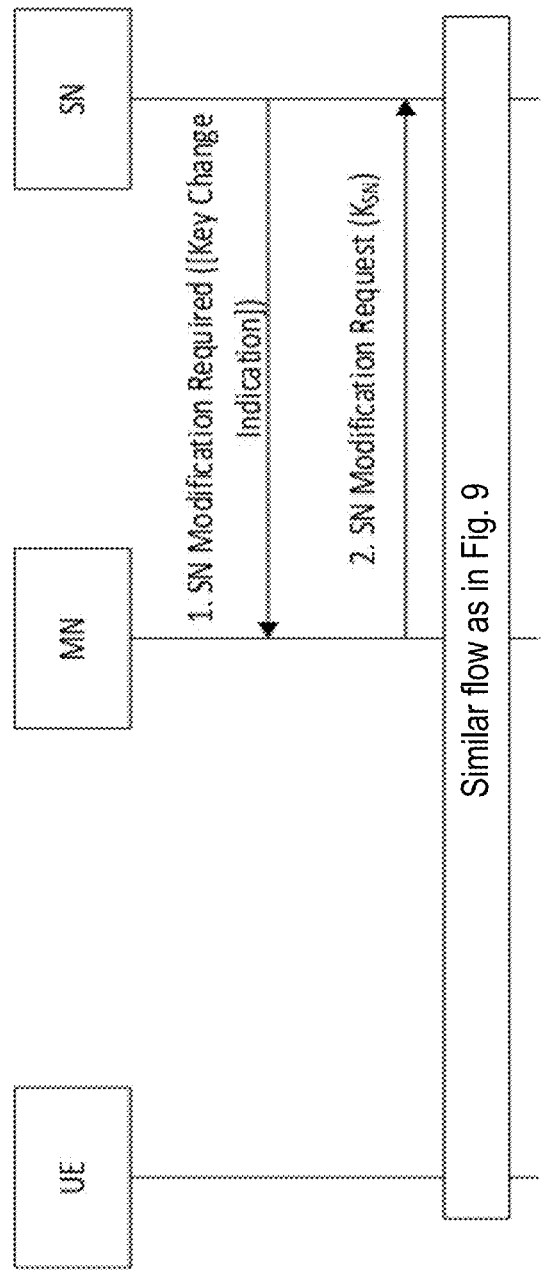
FIG. 10 is a combined flowchart and signaling scheme illustrating prior art.
Figure 11:
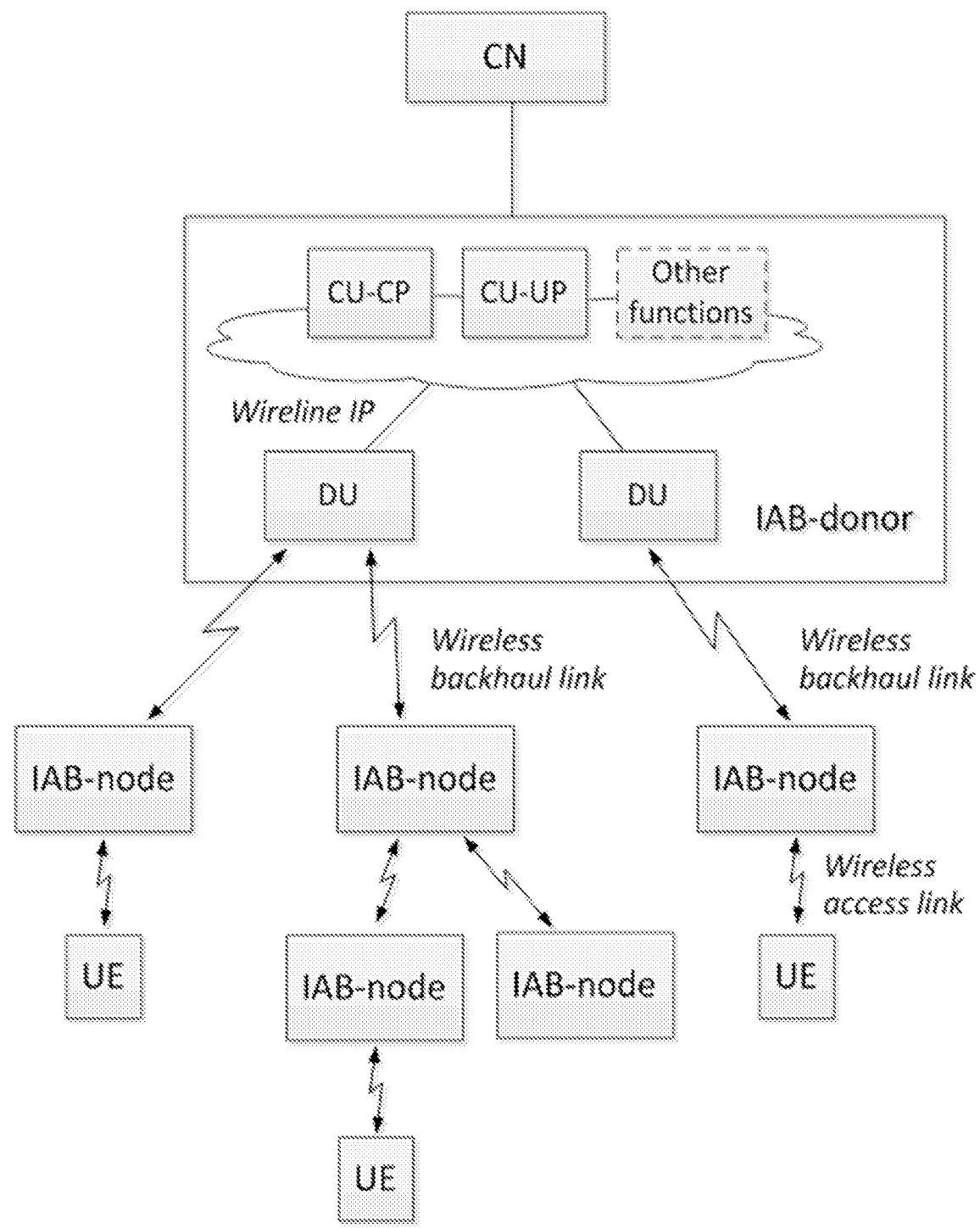
FIG. 11 is a schematic block diagram illustrating prior art.
Figure 12:
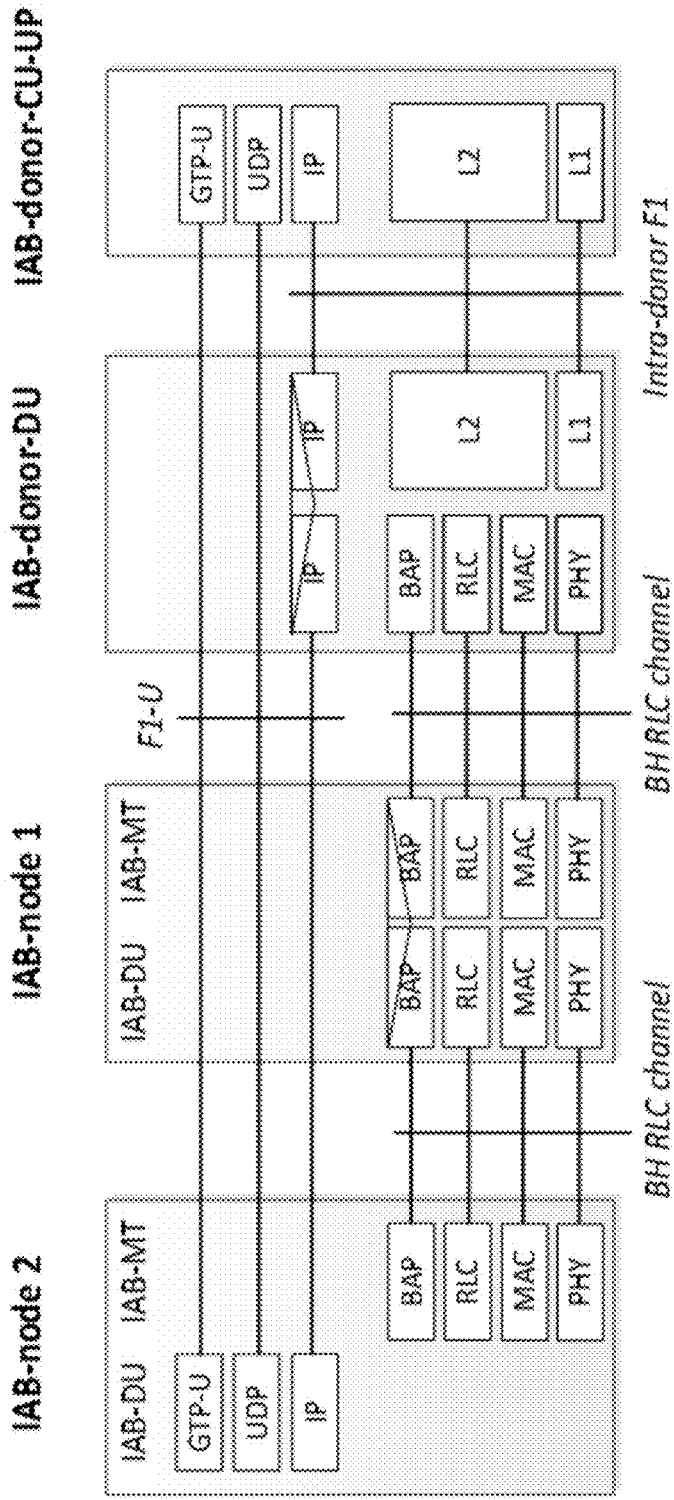
FIG. 12 is a schematic block diagram illustrating prior art.
Figure 13:
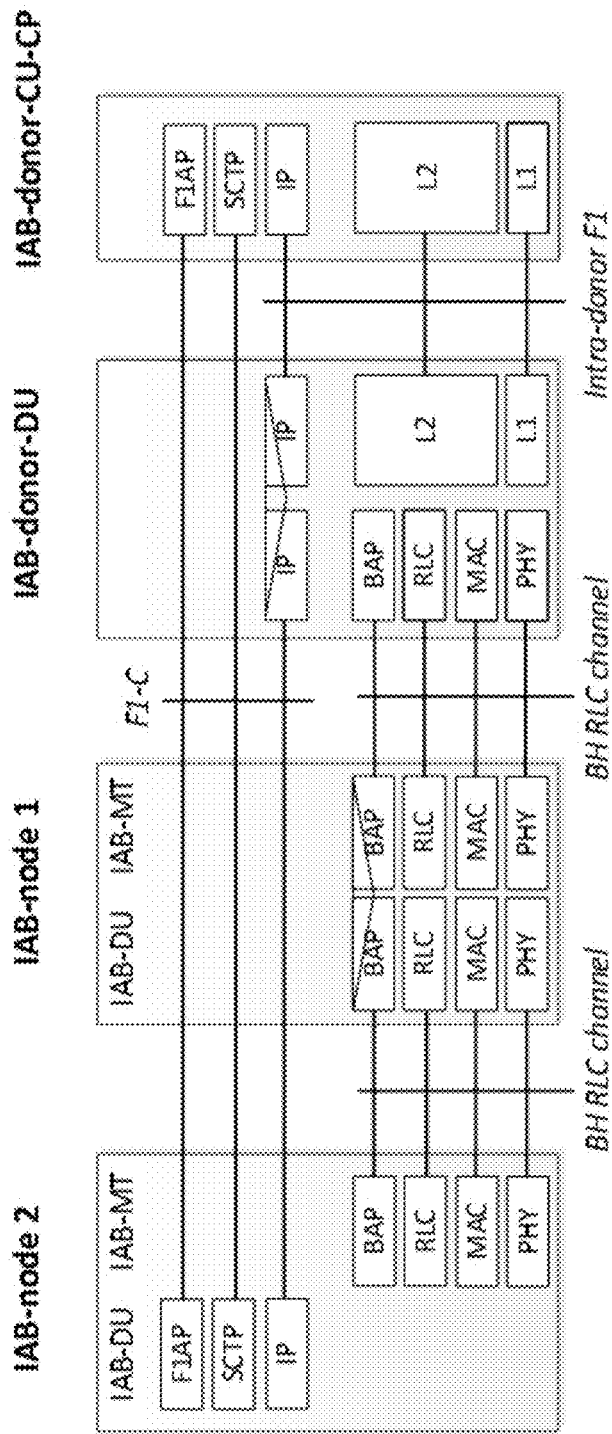
FIG. 13 is a schematic block diagram illustrating prior art.
Figure 14:
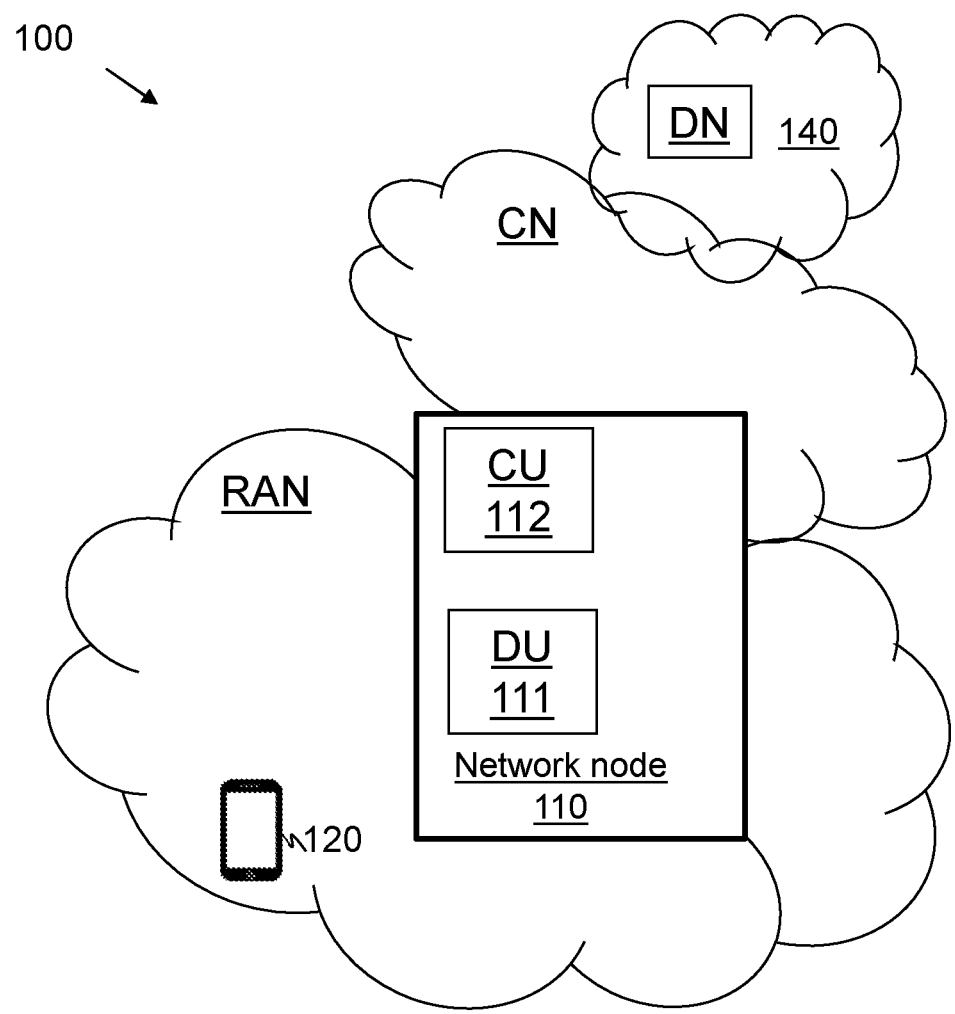
FIG. 14 is a schematic block diagram depicting embodiments of a wireless communications network.

FIG. 14 is a schematic overview depicting a wireless communications network 100 wherein embodiments herein may be implemented. The wireless communications network 100 comprises one or more RANs and one or more CNs. The wireless communications network 100 may use 5 Fifth Generation New Radio, (5G NR) but may further use a number of other different Radio Access Technologies RAT)s, such as, LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband UMB), just to mention a few possible implementations.

A number of network nodes operate in the wireless communications network 100, such as a network node 110. The network node 110 provides radio access in one or more cells. This may mean that the network node 110 provides radio coverage over a geographical area by means of its antenna beams. The network node 110 may be a transmission and reception point e.g. a radio access network node such as a base station, e.g. a radio base station such as a NodeB, an evolved Node B eNB, (eNode B), an NR Node B (gNB), an ng-gNB, a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a radio device within the cell served by network node 110 depending e.g. on the radio access technology and terminology used.

The network node 110 operates in CU-DU split architecture and comprises one or more DU nodes such as a DU node 111 and a CU node 112. The CU node 112 may operate with separation of CU-CP and CU-UP.

UEs such as the UE 120 operate in the wireless communications network 100. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the TRP 110, one or more RANs to one or more CNs. It should be understood by the skilled in the art that the UE 120 relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Methods herein may be performed by the DU node 111 and the UE 120. As an alternative, a Distributed Node (DN) and functionality, e.g. comprised in a cloud 140 as shown in FIG. 14, may be used for performing or partly performing the methods.

According to embodiments herein, in a CU-DU split architecture, the DU node 111 is enabled to process a subset of control plane and user plane messages, wherein this e.g. may be accomplished by:

- Configuring the UE 120 with a secondary security key, associated with the DU node 111.
- The UE 120 deriving the associated UP and CP secondary security keys e.g. encryption and/or integrity keys, also referred to as alternate keys.
- Some UL and/or DL data transmitted using the secondary security key, which may be decoded and/or integrity-verified at the DU node 111.
- The DU node 111 taking some action, e.g. send a command to the UE 120 to change UE 120 behavior, throttle UP and/or DL data of certain bearers, etc. after decoding and/or processing the UL and/or DL data that is being transmitted between the CU node 113 and DU node 111.

The method will first be described in as seen from the DU node 111 perspective together with FIG. 15, then as seen from the UE 120 perspective together with FIG. 16.

Figure 15:
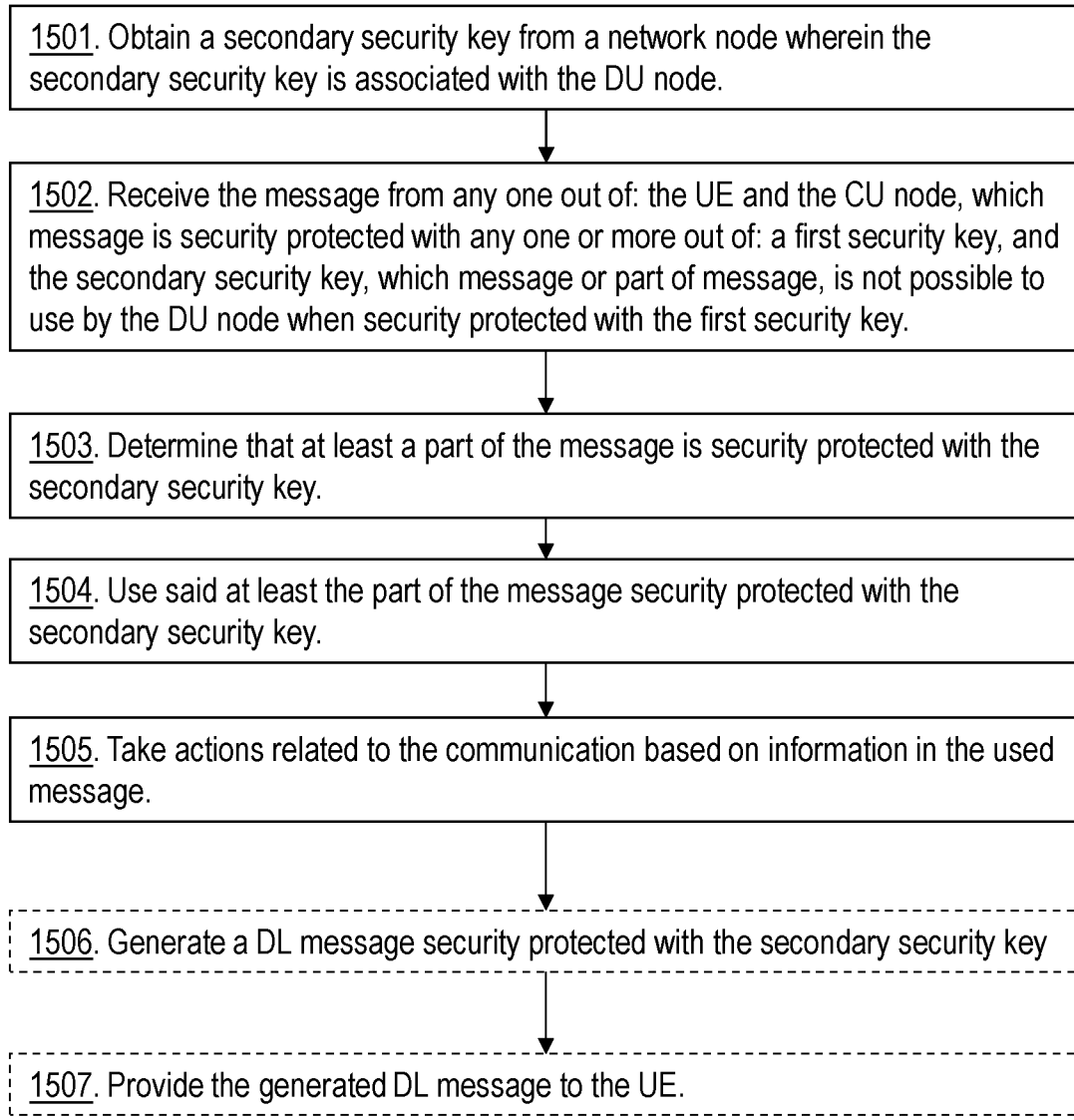
FIG. 15 is a flowchart depicting embodiments of a method in a DU node.

FIG. 15 shows example embodiments of a method performed by the DU node 111 for handling a message in a communication between the UE 120, the DU node 111 and the CU node 112 in a wireless communications network 100. The message may be any one out of an UL message or a DL message. The message may e.g. any one out of a control plane message or a user plane message. The message may e.g. an RRC message.

The method comprises one or more of the following actions, which actions may be taken in any suitable order. Actions that are optional are marked with dashed boxes in the figure.

Action 1501

The DU node 111 obtains a secondary security key from a network node. The secondary security key may e.g. be received from the CU node 112 or e.g. an AMF node or Authentication Server Function (AUSF) node. The secondary security key is associated with the DU node 111. This means that a message or a part of it that is security protected with the secondary security key can be used by the DU node 111, e.g. encrypted or integrity verified.

Action 1502

Messages are sent between the UE 120, and the CU node 112 via the DU node 111 in the communication. That means messages are sent from the UE 120 via the DU node 111 node towards the CU node 112, referred to as UL messages, or in the opposite direction from the CU node 112 via the DU node 111 towards the UE 120 referred to as DL messages. These messages or parts of them are security protected with a first security key, the secondary security key or both. The first security key may also be referred to as the main key. The messages security protected with the first security key can be used by the UE 120 or the CU node 112. The messages or parts of them security protected with the secondary security key can be security processed by the DU node 111. The messages or parts of them security protected with the first security key cannot be security processed by the DU node 111. The DU node 111 receives the message from any one out of: the UE 120 and the CU node 112, which message is security protected with any one or more out of: a first security key, and the secondary security key, which message or part of message, is not possible to use by the DU node 111 when security protected with the first security key.

Security protecting the message may be represented by any one or more out of: encrypting the message, or integrity-protecting the message. This means that in some embodiments, security protecting the message is performed by encrypting the message. In some alternative embodiments, security protecting the message is performed by integrity-protecting the message.

Using the security protected message may be represented by any one or more out of: decrypting the security protected message, or integrity-verify the security protected message. This means that in some embodiments, using the security protected message is performed by decrypting the security protected message. In some alternative embodiments, using the security protected message is performed by integrity-verify the security protected message.

Action 1503

As mentioned above, a message or parts of it security protected with the secondary security key can be security processed by the DU node 111, but if security protected with the first security key the message or parts of it cannot be security processed by the DU node 111. Therefore, the DU node 111 needs to find out if a message or part of it is protected with the secondary security key, and in that case the DU node 111 can use the message or part of it, e.g. encrypt it.

In this example scenario, the DU node 111 determines that at least a part of the message is security protected with the secondary security key.

The determining may be based on any one or more out of:
That the message is received on a radio bearer associated with the secondary security key,
that the message comprises an Logical Channel Identity, LCID, associated with the secondary security key,
that a flag is comprised in a header of the message, indicating that the secondary security key shall be used for the message,
that the message comprises an indication that the message or a part of the message is for the DU node 111 and need not be forwarded to the CU node 112, wherein the message is an UL message from UE 120,
that the message comprises an indication that the message or a part of the message is for the DU node 111 and need not be forwarded to the UE 120, wherein the message is an DL message from CU node 112.

Action 1504

The DU node 111 uses said at least the part of the message security protected with the secondary security key.

In some embodiments, using the security protected message is performed by decrypting the security protected message. In some alternative embodiments, using the security protected message is performed by integrity-verify the security protected message.

Action 1505

The DU node 111 takes actions related to the communication based on information in the security processed message. This may be performed independently of any of the CU node 112 and the UE 120. When the DU node 111 has security processed the message such as e.g. decrypted or integrity-verified the security protected message by means of the secondary security key, the DU node 111 is capable of processing the message and take actions by its own instead of just forwarding every message to and/or from the CU node 112 and waiting for a command from the CU.

The actions may comprise any one or more out of:
providing an indication to the UE 120 to change the UE behaviour,
adjusting any one or more out of Uplink, UL, data of certain bearers, and Downlink, DL, data, of certain bearers,
starting or stopping duplication of UL or DL data of some bearers,
changing, removing, or adding cells,
adjusting routing path for data,
recording logs,
providing logs to other nodes for data analytics.

Action 1506

In some embodiments, the DU node 111 generates a DL message security protected with the secondary security key.

Action 1507

The DU node 111 may in these embodiments provide the generated DL message to the UE 120.

The method will now be described as seen from the UE 120 perspective. FIG. 16 shows example embodiments of a method performed by the UE 120 for handling a message in a communication between the UE 120, the DU node 111, and the CU node 112 in the wireless communications network 100. The message may be any one out of an UL message or a DL message. The message may e.g. any one out of a control plane message or a user plane message. The message may e.g. an RRC message.

The method comprises one or more of the following actions, which actions may be taken in any suitable order. Actions that are optional are marked with dashed boxes in the figure.

Action 1601

As hinted above, messages are sent between the UE 120, and the CU node 112 via the DU node 111. That means messages are sent from the UE 120 via the DU node 111 node towards the CU node 112, referred to as UL messages, or in the opposite direction from the CU node 112 via the DU node 111 towards the UE 120 referred to as DL messages. These messages or parts of them are security protected with the first security key, the secondary security key or both. The messages security protected with the first security key can be security processed by the UE 120 or the CU node 112. The messages or parts of them security protected with the secondary security key can be security processed by the DU node 111. The messages or parts of them security protected with the first security key cannot be security processed by the DU node 111.

The UE 120 obtains a first security key associated with the CU node 112, and a secondary security key associated with the DU node 111. A message security protected with the first security key is not possible to use by the DU node 111.

By obtaining the first security key and the secondary security key, the UE 120 is capable of security protect messages with the first security key, the secondary security key or both. The UE 120 is further capable of use messages protected with the first security key, the secondary security key or both.

Security protecting the message may be represented by any one or more out of: encrypting the message, or integrity-protecting the message. This means that in some embodiments, security protecting the message is performed by encrypting the message. In some alternative embodiments, security protecting the message is performed by integrity-protecting the message.

Using the security protected message may be represented by any one or more out of: decrypting the security protected message, or integrity-verify the security protected message. This means that in some embodiments, using the security protected message is performed by decrypting the security protected message. In some alternative embodiments, using the security protected message is performed by integrity-verify the security protected message.

In some embodiments, the secondary security key associated with the DU node 111 is obtained by obtaining a parameter for deriving the secondary security key. The parameter may e.g. be a counter, cell identifier, frequency, string.

In some other embodiments, the secondary security key associated with the DU node 111 is obtained from a network node.

Action 1602

The UE 120 determines which one out of the first security key and the secondary security key that is to be used for at least a part of a message, for security protection.

This means which one out of the first security key and the secondary security key that is to be used for security protect at least a part of the message to be sent, or for using, e.g. decrypting or integrity-verifying at least a part of the message which has been received.

Action 1603

When determining that the secondary security key is used for at least a part of the message for security protection, the UE 120 communicates the message with the DU node 111, such as e.g. sends the message to the DU node 111 or receives and security process the message from the DU node 111. At least part of the message is security protected with the secondary security key.

The security protection with the secondary security key enables the DU node 111 to security process said at least the part of the message, and take actions related to the communication based on information in the security processed message.

The communicated message may comprise an indication. The indication indicates that at least part message is security protected with the secondary security key. The indication may comprise any one or more out of:
- That the message is communicated on a radio bearer associated with the secondary security key,
- that the message comprises an Logical Channel Identity, LCID, associated with the secondary security key,
- that a flag is comprised in a header of the message, indicating that the secondary security key shall be used for the message, e.g. to security process the message,
- that the message or a part of the message is for the DU node 111 and need not be forwarded to the CU node 112, wherein the message is an UL message from UE 120, and
- that the message comprises an indication that the message or a part of the message is for the DU node 111 and need not be forwarded to the UE 120, wherein the message is an DL message from CU node 112.

The embodiments described above will now be further explained and exemplified. The example embodiments described below may be combined with any suitable embodiment above.

The description of embodiments herein is targeting NR. However, the mechanisms are applicable also to other systems like LTE, when they adopt a CU-DU like split architecture. Most of the description below is focusing on the CP aspects i.e. RRC signaling. However, the mechanisms are equally applicable to UP i.e. data radio bearers.

Key Generation and Communication

Enabling More than One Security Key for a Radio Bearer or Cell Group Configuration Network to UE Enabling more than one security key means enabling both the first security key and the secondary security key.

As mentioned above, messages security protected with the first security key can be used by the UE 120 or the CU node 112 for security processing. Messages or parts of them, security protected with the secondary security key can be used by the DU node 111 for security processing.

In some example embodiments, the UE 120 will be provided with a counter e.g. referred to as d-Counter, that it will use to derive another security key, that is the secondary security key, for a radio bearer configuration, even though it is in single connectivity.

Case 1: Single Connectivity

This may be performed either in an initial Access Stratum (AS) security activation reception of Security Mode Command after an RRCSetup message, or any time after that in an RRC Reconfiguration message e.g. in masterKeyUpdate Information Element (IE) or a new IE.

When the UE 120 receives the d-counter, it uses it to update CP security keys, e.g.
- Update the KgNB-alternate key based on the KgNB key and using the received d-Counter value; and/or
- derive the $K_{RRCenc}$-alternate and $K_{Upenc}$-alternate keys and $K_{RRCint}$-alternate and $K_{Upint}$-alternate keys;

Wherein the secondary security key is referred to any one or more out of: KgNB-alternate, $K_{RRCenc}$-alternate and $K_{Upenc}$-alternate, $K_{RRCint}$-alternate and $K_{Upint}$-alternate keys.

Case 2: Dual Connectivity

In case there is a direct RRC connection between the UE 120 and the SN e.g. Signaling Radio Bearer 3 (SRB3), and the SN is also employing a CU-DU split architecture, an alternate key, i.e. the secondary security key, may be provided also regarding the RRC termination at the secondary node.

The d-Counter associated with the SN may be provided in several ways such as:
- at the top level of an RRCReconfiguration message that comprises a secondary cell group configuration,
- at the radioBearerConfig associated with the secondary cell group,
- at the cellgroupconfig of the secondary cell group, It may also be that the d-Counter used for the MCG and the SCG is the same.

Enabling the DU Node 111 with Security

The CU node 112 may derive the secondary security key, such as the alternate key, KgNB-alternate and send it to the DU node 111. This may be done using an enhanced version of an F1 Application Protocol (F1AP) message, e.g. an gNB-CU configuration update, UE context modification request, etc. As an alternative, a new message may be defined for this purpose.

In an alternative, it may be envisioned that the CU node 112 communicates the secondary security key such as the alternate key to the DU node 111 e.g. via RRC. For example, if the concerned DU node 111 belongs to an IAB node, the CU node 112 may send the secondary security key such as the alternate key to the IAB-MT, which passes it on to the IAB-DU node, e.g. the DU node 111. Even in a non IAB case, an RRC protocol and associated PDCP entity may be provided and/or configured at the DU node 111 to enable CU-DU RRC signaling. For example, an F1-AP message that comprises an embedded RRC message may be sent to the DU node 111, with an indication that the RRC message is intended for the DU node 111 itself and not for a UE 120 that is being served by the DU node 111.

Alternatively, the secondary security key such as the alternate key may be provided to the CU node 112 and DU node 111 from another network node, for example AMF or Authentication Server Function (AUSF).

How the Secondary Security Key Such as the Alternate Key is Used

At UE 120

There are several alternatives on how the UE 120 handles the message when being a DL message, e.g. a DL RRC message, when it is configured with the secondary security key such as the alternate key:

In some embodiments, the UE 120 may try to security process, such as e.g. decrypt or integrity-verify a received message, e.g. an RRC message using the first security key for security processing, also referred to as main key, and if that fails, then it tries to use the secondary security key for security processing.

In some embodiments, certain Logical Channel IDs (LCIDs) are associated with the first security key, while others are associated with the secondary security key e.g. LCID 1 used for SRB1 messages using the first security key, LCID 4 used for SRB1 messages using the secondary security key, LCID 2 used for SRB2 messages using the first security key, LCID 5 used for SRB2 messages using the secondary security key, etc. The UE 120 will decide which key to use to decrypt or integrity-verify the message based on which LCID the message was received in.

The association of the first security key or secondary security key with an LCID may be provided to the UE 120 in an RRC Reconfiguration e.g. in the logical channel configuration, where the security key is indicated for each LCID, the absence of this field indicating the use of the first security key; or there may be an IE in the Reconfiguration message that includes a list of LCIDs that are associated with the secondary security key, etc.

The key association may be made also at radio bearer level e.g. two SRB1 radio bearers configured, one using the first security key and another using the secondary security key.

Multiple PDCP entities may be used and/or associated for a given radio bearer and different security keys, i.e. the first security key and the secondary security key, are used for each entity.

A flag or indicator may also be included in the PDCP header that indicates which key out of the first security key and the secondary security key that is to be used.

Tunneling of PDCP may be done such that an outer PDCP entity encapsulates an inner PDCP entity. Different security keys, comprising the first security key and the secondary security key, are used for outer and inner PDCP entities.

There are several alternatives on how the UE 120 handles the message when being an UL message, e.g. an UL RRC messages when it is configured with the secondary security key such as an alternate key:

If the UL message is an UL RRC message and is sent in response to a DL RRC message e.g. an RRC complete message, the UE Information Response, etc, the UE 120 uses the same key associated with the DL message that triggered this UL message. E.g. if the UE Information Request was sent with the secondary security key, the UE 120 will use the secondary security key while preparing the PDCP packet that will contain the UE Information Response. In other words, UE 120 may do a reflective protection.

The UE 120 may be pre-configured e.g. by using an RRC Reconfiguration message, which security key out of the first security key and the secondary security key, to use to which message. E.g. to use the first security key to send RRC complete messages, and to use the secondary security key to send the measurement reports, etc.

The DL RRC message may comprise an indication indicating which security key out of the first security key and the secondary security key, to send UL RRC messages that are in response to this message. E.g. a measurement configuration may comprise which security key out of the first security key and the secondary security key, to use for preparing a PDCP packet that comprises future measurement reports that result due to this configuration.

Which security key out of the first security key and the secondary security key may depend upon which LCID the message will be sent in.

The security key association may be made also at radio bearer level. I.e. some radio bearers may be configured to use the first security key and some radio bearers may be configured to use the secondary security key.

In some alternative embodiments, the security key configuration for UL and/or DL messages is that same UE e.g. the UE 120, uses the same key, secondary security key or first security key, for decrypting DL messages as well as encrypting UL messages.

In some other alternative embodiments, the security key configuration for UL and/or DL messages is different, e.g. the UE 120 uses the first security key for decrypting DL messages but used the secondary security key for encrypting UL messages.

Multiple PDCP entities may be used such that different security keys, out of the first security key and the secondary security key, are used for each entity.

Tunneling of PDCP may be performed such that an outer PDCP entity encapsulates an inner PDCP entity. Different security keys, out of the first security key and the secondary security key, are used for outer and inner PDCP entities.

At the DU Node 111

There are several alternatives for enabling the DU node 111 to security process the message, e.g. encrypt or decrypt and integrity-protect or integrity-verify the message that is using the secondary security key.

In some embodiments, the DU node 111 may always try to security process, e.g. decode the UL and/or DL RRC messages by means of the secondary security key, before forwarding them to the UE 120 in DL messages, or the CU node 112 in UL messages.

In some embodiments, the DU node 111 may always try to decode the UL and/or DL RRC message using the secondary security key, but may forwards the UL messages to the CU node 112 only if it was not able to use the security key e.g. by doing the decoding, i.e. the message was using, e.g. being encrypted by the first security key.

In some embodiments, the DU node 111 is able to generate DL messages, e.g. DL RRC messages, using the secondary security key by its own.

In some other embodiments, the DU node 111 is not able to generate DL messages, e.g. DL RRC messages, by using the secondary security key by its own. In these embodiments, the DU node 111 is only able to intercept and decode DL messages, e.g. DL RRC messages, that were generated by the CU node 112 but were using the secondary security key.

Certain LCIDs may be associated with the first security key, while others are associated with the secondary security key. E.g. LCID 1 is used for SRB1 messages using the first security key, LCID 4 is used for SRB1 messages using the secondary security key, LCID 2 used for SRB2 messages using the first security key, and LCID 5 used for SRB2 messages using the secondary security key, etc. The DU node 111 may use such as e.g. decrypt and/or integrity-verify only those packets that are received on the LCIDs that are associated with the secondary security key.

In some of these embodiments, the DU node 111 may be configured which LCIDs that are associated with the secondary security key, e.g. an F1-AP configuration from the CU node 112, a configuration from another network node such as an Operation and Maintenance (OAM) function.

A flag is may be comprised in an PDCP header that indicates which security key out of the first security key and the secondary security key is to be used.

In some of these embodiments, tunneling of PDCP may be performed such that an outer PDCP entity encapsulates an inner PDCP entity. Different keys out of the first security key and the secondary security key, are used for outer and inner PDCP entities. For example, a message that only the UE 120 is supposed to process may be encrypted first using the first security key, and it is put in a transparent container inside a PDCP PDU that is encrypted using the secondary security key. The DU node 111 will then be able to process and/or understand the outer message, but not the inner one. The DU node 111 may pass either the whole message or just the inner message to the UE 120.

Other Details

Uplink or downlink messages may also comprise an indication indicating which entity the messages or parts of the messages belong to. For example:

An UL message from UE 120 may comprise an indication that a certain RRC message or parts of it are for the DU node 111 and need not be forwarded to the CU. This message or parts of it is security protected with the secondary security key.

An DL message from CU node 112 may comprise an indication that a certain RRC message or parts of it are for the DU node 111 and need not be forwarded to the UE 120. This message or parts of it is security protected with the secondary security key.

Different LCIDs may be associated with different termination points in the network. For example:

An example messages arriving via LCID x is destined for the DU node 111 and the related messages need not be forwarded to CU node 112. This message or parts of it is security protected with the secondary security key.

An example messages arriving via LCID y may be processed and/or understood by the DU node 111, but nevertheless the related messages are also to be forwarded to the CU node 112. This message or parts of it is security protected with the secondary security key An example messages arriving via LCID z is destined for the CU node 112 only and the DU node 111 will forward them to the CU node 112 without trying to decode them. Related messages need not be forwarded to CU. This message or parts of it may be security protected with the first security key.

The multiple PDCP entities mentioned above may be generalized to layers. For example, there may be multiple RLC layers. E.g. one RLC layer comprising payload for the DU node 111, which payload is security protected with the secondary security key. Further, another RLC layer comprising payload for the CU node 112 which payload is security protected with the first security key.

The tunneling of PDCP mentioned above may be generalized to tunneling in other layers. For example, RLC layer may tunnel another RLC such that outer layer comprises payload for DU node 111 and an inner layer comprises payload for the CU node 112. Wherein the payload for the outer layer is security protected with the secondary security key, and wherein the payload for the inner layer is security protected with the first security key.

In order to perform the security protection such as e.g. the encryption and/or decryption, or integrity-protection and/or integrity-verification, a PDCP or PDCP-like entity may be established and/or configured in the DU node 111. In some embodiments, there is such an entity at the DU node 111 only for a subset of the LCIDs e.g. for the LCID x and y described above where the DU node 111 may process the data which in this case is security protected with the secondary security key, there will be an associated PDCP like entity that is configured with the corresponding secondary security key.

If the DU node 111 belongs to an IAB node i.e. the DU node 111 is part of an IAB node, then PDCP entities may in some embodiments be established at the IAB-MT that is co-located with the DU node 111 to provide this functionality. In some of these embodiments, the secondary security key will be the same as the KgNB key used for and/or at the IAB-MT. In another embodiment, the IAB-MT will receive a secondary security key y different from the KgNB.

The same principles may apply with regard to the RRC protocol. That is, an RRC protocol entity or entities may be established and/or configured in the DU node 111. Or in the case of IAB nodes, RRC protocol entities at the co-located IAB-MT may be established for this purpose.

In some embodiments, the DU node 111 is configured with information about the secondary security key, configuration about bearers and/or LCIDs e.g. which bearers and/or LCIDs are associated with the secondary security key, etc, via F1-AP signaling. In other embodiments, the DU node 111 is configured, just like a UE, via RRC signaling. That is, there may be RRC messages that are sent only between the DU node 111 and CU node 112 that are used to configure the behavior of the DU node 111 when it comes to the handling of RRC messages between the CU node 112 and UE 120.

In some embodiments, a dual MAC stack may be kept at the DU node 111 and the UE 120 similar to a DC like operation, even though the UE 120 is not in DC. One MAC will be associated with the CU node 112 terminated messages security protected with the first security key, and another MAC will be associated with the DU node 111 terminated message security protected with the secondary security key. That is, from the UE 120's point of view, it may look like it is in DC, where the MAC handling the CU node 112 terminated messages may be considered as the MCG MAC, while the MAC handling the DU node 111 terminated messages could be considered as the SCG MAC.

Example Signaling/Procedures

```
-- ASN1START
-- TAG-SECURITYMODECOMMAND-START
SecurityModeCommand ::=         SEQUENCE {
   rrc-TransactionIdentifier      RRC-TransactionIdentifier,
   criticalExtensions             CHOICE {
      securityModeCommand            SecurityModeCommand-IEs,
      criticalExtensionsFuture       SEQUENCE { }
   }
}
SecurityModeCommand-IEs ::=     SEQUENCE {
   securityConfigSMC              SecurityConfigSMC,
   lateNonCriticalExtension       OCTET STRING
OPTIONAL,
   nonCriticalExtension           SecurityModeCommand-v17xy-IEs
OPTIONAL
}
SecurityConfigSMC ::=           SEQUENCE {
   securityAlgorithmConfig        SecurityAlgorithmConfig,
```

-continued

```
...
}
SecurityModeCommand-v17xy-IEs  ::=  SEQUENCE {
    d-Counter       d-Counter     OPTIONAL, -- Need N
}
-- TAG-SECURITYMODECOMMAND-STOP
-- ASN1STOP
``` d-Counter

The IE d-Counter is a counter used upon initial configuration of secondary security for a UE 120 . . . .

```
            -- ASN1START
            -- TAG-dCOUNTER-START
            d-Counter ::= INTEGER (0..65535)
```

If the UE 120 is dual connected, both the MN and SN employing CU-DU split, then the UE 120 may have two such d-Counters . . . .

Reception of the RRCSetup by the UE 120

The UE 120 shall perform the following actions upon reception of the RRCSetup:
1> if the RRCSetup is received in response to an RRCReestabfishmentRequest; or
1> if the RRCSetup is received in response to an RRCResumeRequest or RRCResumeRequest1:
   2> discard any stored UE Inactive AS context and suspendConfig;
   2> discard any current AS security context including the $K_{RRCenc}$ key, the $K_{RRCint}$ key, the $K_{UPint}$ key, the $K_{UPenc}$ key, the $K_{RRCenc}$-alternate key, the $K_{RRCint}$-alternate key, the $K_{UPint}$-alternate key and $K_{UPenc}$-alternate key;
   <<skipped parts>>

Reception of the SecurityModeCommand by the UE 120

The UE 120 shall:
1> derive the KgNB key, as specified in TS 33.501;
1> derive the $K_{RRCint}$ key associated with the integrityProtAlgorithm indicated in the SecurityModeCommand message, as specified in 3GPP TS 33.501;
1> request lower layers to verify the integrity protection of the SecurityModeCommand message, using the algorithm indicated by the integrityProtAlgorithm as included in the SecurityModeCommand message and the $K_{RRCint}$ key;
1> if the SecurityModeCommand message passes the integrity protection check:
   2> derive the $K_{RRCenc}$ key and the $K_{UPenc}$ key associated with the cipheringAlgorithm indicated in the SecurityModeCommand message, as specified in 3GPP TS 33.501;
   2> derive the $K_{UPint}$ key associated with the integrityProtAlgorithm indicated in the SecurityModeCommand message, as specified in 3GPP TS 33.501;
   2> if d-counter is included:
   2> derive the KgNB-alternate key based on the KgNB and the d-Counter as specified in TS 33.501[11]
   2> derive the $K_{RRCint-alternate}$ associated with the integrityProtAlgorithm indicated in the SecurityModeCommand message, as specified in 3GPP TS 33.501;
   2> derive the $K_{RRCenc-alternate}$ key and the $K_{UPenc-alternate}$ key associated with the cipheringAlgorithm indicated in the SecurityModeCommand message, as specified in 3GPP TS 33.501;
   2> configure lower layers to apply SRB integrity protection using the indicated algorithm and the $K_{RRCint}$ key immediately, i.e. integrity protection shall be applied to all subsequent messages received and sent by the UE, including the SecurityModeComplete message;
   2> configure lower layers to apply SRB ciphering using the indicated algorithm, the $K_{RRCenc}$ keyafter completing the procedure, i.e. ciphering shall be applied to all subsequent messages received and sent by the UE, except for the SecurityModeComplete message which is sent unciphered;
   2> consider AS security to be activated;
   2> submit the SecurityModeComplete message to lower layers for transmission, upon which the procedure ends;
1> else:
   2> continue using the configuration used prior to the reception of the SecurityModeCommand message, i.e. neither appl i.e. neither apply integrity protection nor ciphering.
   2> submit the SecurityModeFailure message to lower layers for transmission, upon which the procedure ends.

Figure 17A:
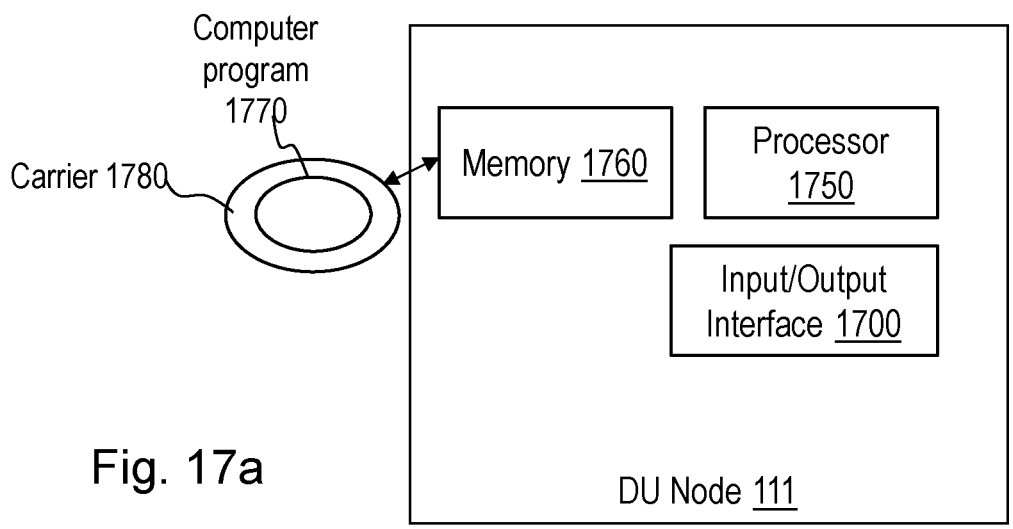
FIGS. 17a and b are schematic block diagrams illustrating embodiments of a DU node.
Figure 17B:
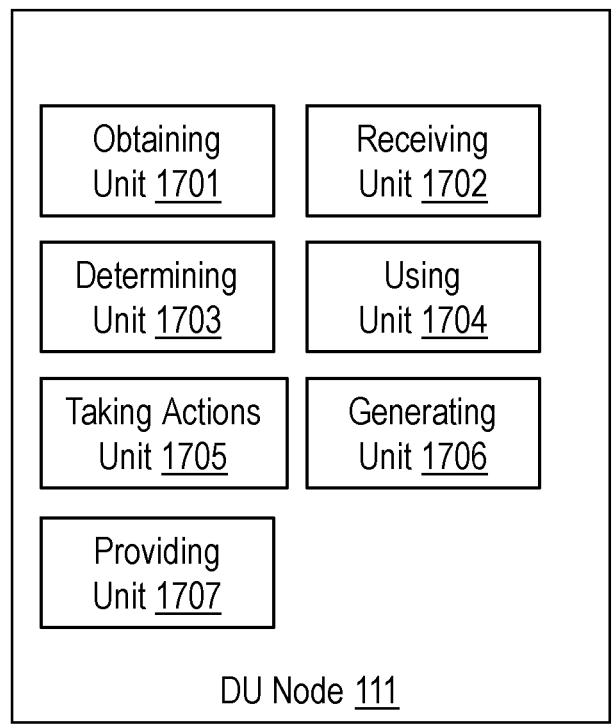

To perform the action as mentioned above, the DU node 111 may comprise the arrangement as shown in FIGS. 17 *a* and *b*. The DU node 111 is configured to handle a message in a communication between the UE 120, the DU node 111 and the CU node 112 in the wireless communications network 100.

The DU node 111 may comprise a respective input and output interface 1700 configured to communicate with the UE 120 and the CU node 112, see FIG. 17*a*. The input and output interface 1800 may comprise a wireless receiver (not shown) and a wireless transmitter (not shown).

The DU node 111 may further be configured to, e.g. by means of an obtaining unit 1701 in the DU node 111, obtain a secondary security key from a network node, which secondary security key is adapted to be associated with the DU node 111.

The DU node 111 may further be configured to, e.g. by means of a receiving unit 1702 in the DU node 111, receive the message from any one out of: the UE 120 and the CU node 112. The message is adapted to be security protected with any one or more out of: a first security key, and the secondary security key. The message or part of message is arranged to not be possible to use by the DU node 111 when security protected with the first security key.

The DU node 111 may further be configured to, e.g. by means of a determining unit 1703 in the DU node 111, determine that at least a part of the message is security protected with the secondary security key, The DU node 111 may further being configured to, e.g. by means of the determining unit 1703 in the DU node 111, determine that at least a part of the message is security protected with the secondary security key based on any one or more out of:
   that the message is received on a radio bearer associated with the secondary security key,
   that the message comprises an Logical Channel Identity (LCID), associated with the secondary security key,
   that a flag is comprised in a header of the message, indicating that the secondary security key shall be used for the message,
   that the message comprises an indication that the message or a part of the message is for the DU node 111 and need not be forwarded to the CU node 112, wherein the message is adapted to be an UL message from UE 120, that the message comprises an indication that the message or a part of the message is for the DU node 111 and need not be forwarded to the UE 120, wherein the message is adapted to be an DL message from CU node 112.

The DU node 111 may further being configured to, e.g. by means of a using unit 1704 in the DU node 111, use said at least the part of the message security protected with the secondary security key.

In some embodiments, the security protected message is further be adapted to be represented by any one or more out of: an encrypted message, or an integrity-protected message. In these embodiments, the DU node 111 may further be configured to, e.g. by means of the using unit 1704 in the DU node 111, use the security protected message by any one or more out of: decrypting the security protected message, or integrity-verify the security protected message.

The DU node 111 may further being configured to, e.g. by means of a taking actions unit 1705 in the DU node 111, take actions related to the communication based on information in the used message.

The DU node 111 may further being configured to, e.g. by means of the taking actions unit 1705 in the DU node 111, take actions related to the communication based on information in the used message, which actions are arranged to be performed independently of any of the CU node 112 and the UE 120.

The DU node 111 may further being configured to, e.g. by means of the taking actions unit 1705 in the DU node 111, take actions related to the communication based on information in the used message by:
  providing an indication to the UE 120 to change the UE behaviour,
  adjusting any one or more out of UL data of certain bearers, and DL data, of certain bearers,
  starting or stopping duplication of UL or DL data of some bearers,
  changing, removing, or adding cells,
  adjusting routing path for data,
  recording logs,
  providing logs to other network nodes for data analytics.

The DU node 111 may further being configured to, e.g. by means of a generating unit 1706 in the DU node 111, generate a DL message security protected with the secondary security key, and, e.g. by means of a providing unit 1707 in the DU node 111, provide the generated message to the UE 120.

The embodiments herein may be implemented through a respective processor or one or more processors, such as the processor 1750 of a processing circuitry in the DU node 111 depicted in FIG. 17a, together with respective computer program code for performing the functions and actions of the embodiments herein. The program code mentioned above may also be provided as a computer program product, for instance in the form of a data carrier carrying computer program code for performing the embodiments herein when being loaded into the DU node 111. One such carrier may be in the form of a CD ROM disc. It is however feasible with other data carriers such as a memory stick. The computer program code may furthermore be provided as pure program code on a server and downloaded to the DU node 111.

The DU node 111 may further comprise a memory 1760 comprising one or more memory units. The memory 1760 comprises instructions executable by the processor in the DU node 111. The memory 1760 is arranged to be used to store e.g. information, indications, data, configurations, security keys, messages, and applications to perform the methods herein when being executed in the DU node 111.

In some embodiments, a computer program 1770 comprises instructions, which when executed by the respective at least one processor 1750, cause the at least one processor of the DU node 111 to perform the actions above.

In some embodiments, a respective carrier 1780 comprises the respective computer program 1770, wherein the carrier 1780 is one of an electronic signal, an optical signal, an electromagnetic signal, a magnetic signal, an electric signal, a radio signal, a microwave signal, or a computer-readable storage medium.

Those skilled in the art will appreciate that the units in the DU node 111 described above may refer to a combination of analog and digital circuits, and/or one or more processors configured with software and/or firmware, e.g. stored in the DU node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 18A:
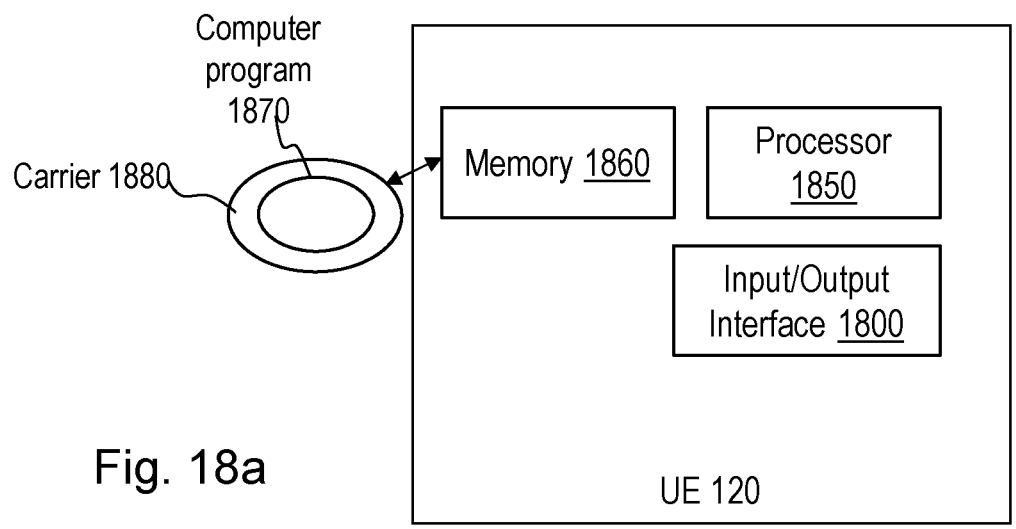
FIGS. 18a and b are schematic block diagrams illustrating embodiments of a UE.
Figure 18B:
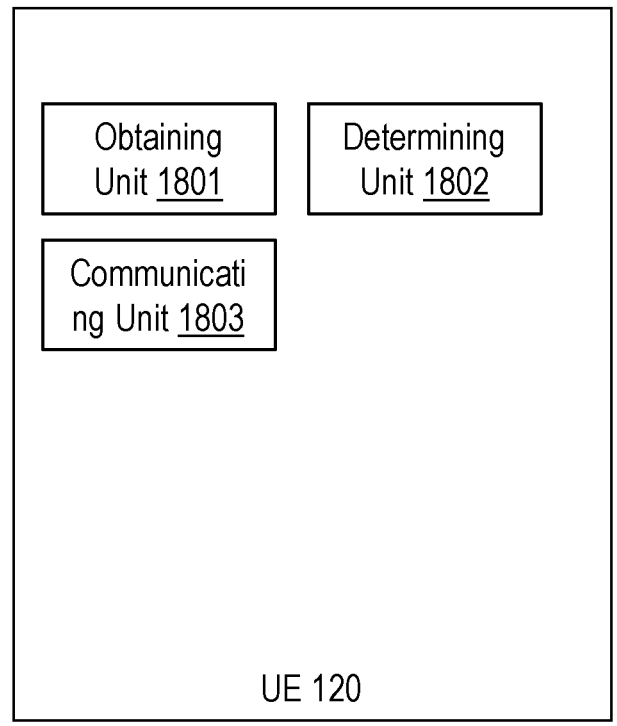

To perform the action as mentioned above, the UE 120 may comprise the arrangement as shown in FIGS. 18 a and b. The UE 120 is configured to handle a message in a communication between the UE 120, the DU node 111, and the CU node 112 in the wireless communications network 100.

The UE 120 may comprise a respective input and output interface 1800 configured to communicate with the DU node 111 and the CU node 112, see FIG. 18a. The input and output interface 1800 may comprise a wireless receiver not shown, and a wireless transmitter not shown.

The UE 120 may further be configured to, e.g. by means of a obtaining unit 1801 in the UE 120, obtain a first security key adapted to be associated with the CU node 112, and a secondary security key adapted to be associated with the DU node 111, wherein a message security protected with the first security key is arranged to not be possible to use by the DU node 111.

The UE 120 may further be configured to, e.g. by means of an obtaining unit 1801 in the UE 120, obtain the security key adapted to be associated with the DU node 111 by any one out of:
  obtain a parameter arranged for deriving the secondary security key e.g. parameters like counter, cell identifier, frequency, string, and
  obtain the secondary security key from a network node.

The UE 120 may further be configured to, e.g. by means of a determining unit 1802 in the UE 120, determine which one out of the first security key and the secondary security key that is to be used for at least a part of a message, for security protection, The UE 120 may further be configured to, e.g. by means of a communicating unit 1803 in the UE 120, when determining that the secondary security key is used for at least a part of a message for security protection, communicate the message with the DU node 111, wherein at least part message is arranged to be security protected with the secondary security key, wherein the security protection with the secondary security key is adapted to enable the DU node 111 to security process said at least the part of the message, and take actions related to the communication based on information in the security processed message.

The communicated message may be adapted to comprise an indication indicating that at least part message is security protected with the secondary security key, which indication is adapted to comprise any one or more out of:

that the message is communicated on a radio bearer associated with the secondary security key, that the message comprises an LCID associated with the secondary security key, that a flag is comprised in a header of the message, indicating that the secondary security key shall be used for the message, that the message or a part of the message is for the DU node 111 and need not be forwarded to the CU node 112, wherein the message is adapted to be an UL message from UE 120, that the message comprises an indication that the message or a part of the message is for the DU node 111 and need not be forwarded to the UE 120, wherein the message is adapted to be an DL message from CU node 112.

Security protecting the message may be adapted to be represented by any one or more out of: encrypting the message, or integrity-protecting the message.

Security processing of the security protected message may be adapted to be represented by any one or more out of: decrypt the security protected message, or integrity-verify the security protected message.

The embodiments herein may be implemented through a respective processor or one or more processors, such as the processor 1850 of a processing circuitry in UE 120 depicted in FIG. 18*a*, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1860 comprising one or more memory units. The memory 1860 comprises instructions executable by the processor in the UE 120. The memory 1860 is arranged to be used to store e.g. information, indications, data, configurations, security keys, messages, and applications to perform the methods herein when being executed in the UE 120.

In some embodiments, a computer program 1870 comprises instructions, which when executed by the respective at least one processor 1850, cause the at least one processor of the UE 120 to perform the actions above.

In some embodiments, a respective carrier 1880 comprises the respective computer program 1870, wherein the carrier 1880 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Further Extensions and Variations

Figure 19:
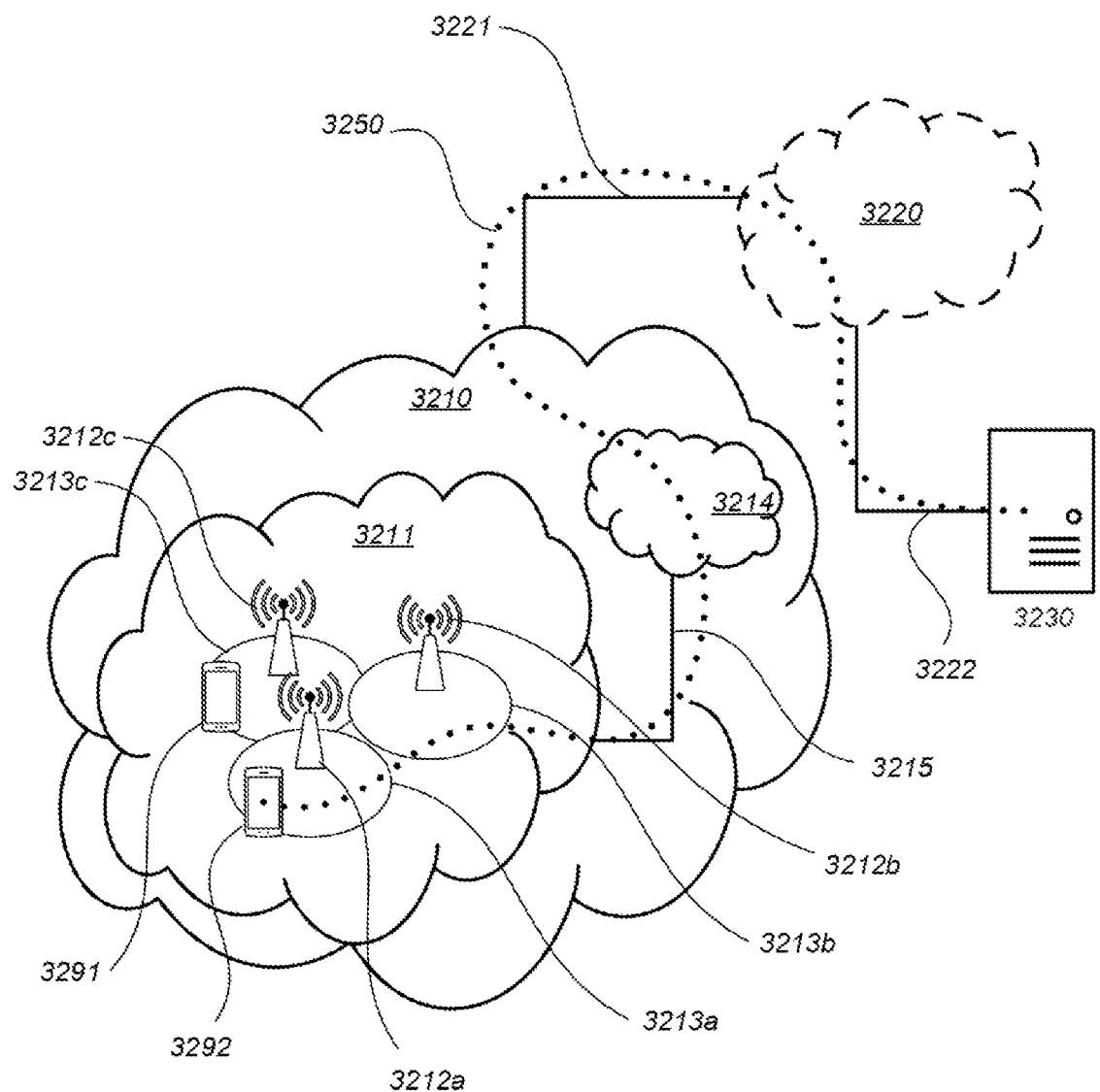
FIG. 19 schematically illustrates a telecommunication network connected via an intermediate network to a host computer.

With reference to FIG. 19, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the DU node 111 and/or CU node 112 in the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment UE e.g. the UE 120 such as a Non-AP STA 3291 located in coverage area 3213*c* is configured to wirelessly connect to, or be paged by, the corresponding base station 3212*c*. A second UE 3292 e.g., the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 19 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 20. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data, which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area not shown) served by the base station 3320. The communication interface 3326 may be configured to facilitate a connection 3360 to the host computer 3310. The connection 3360 may be direct or it may pass through a core network (not shown in FIG. 20) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 20:
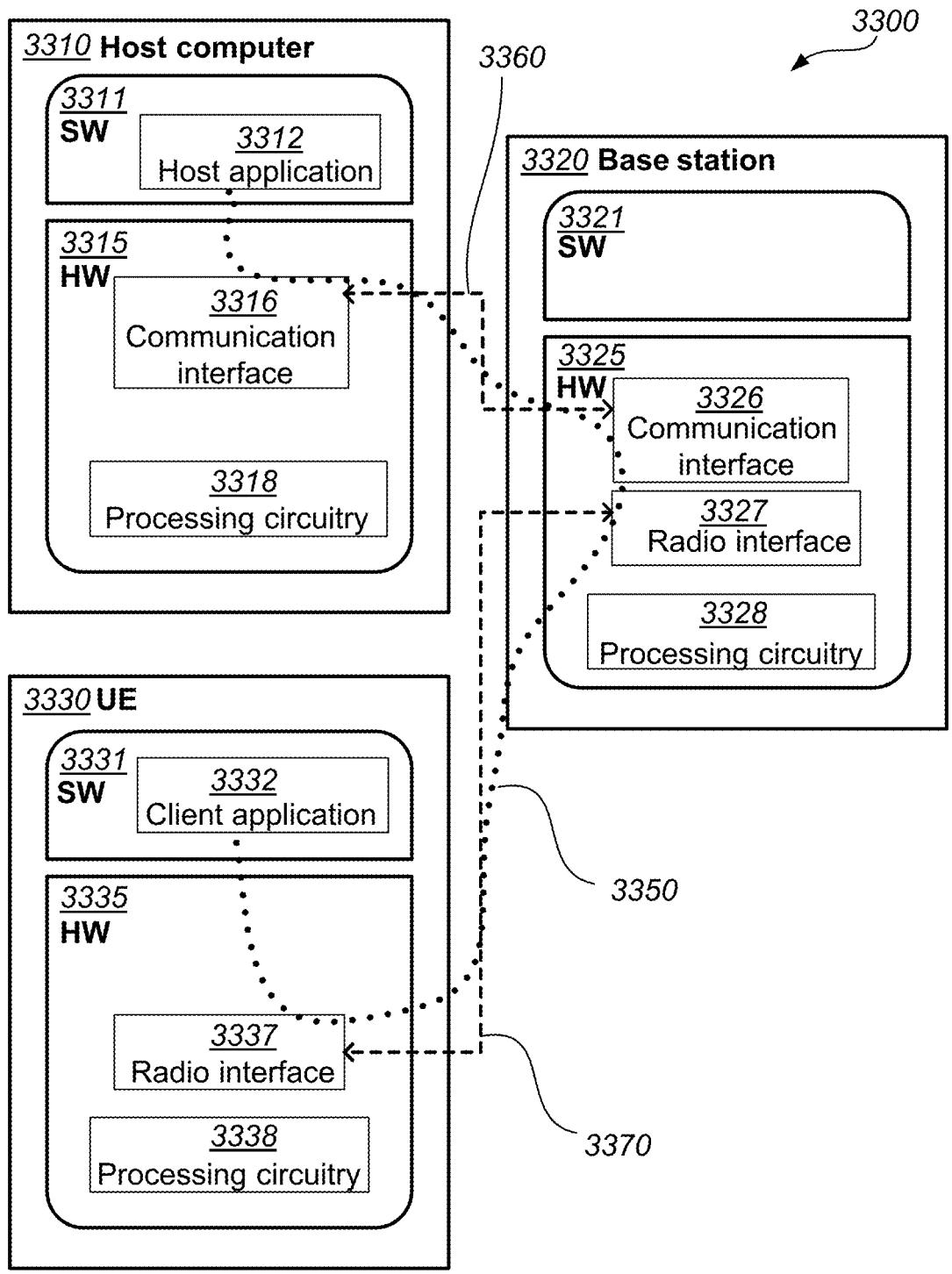
FIG. 20 is a generalized block diagram of a host computer communicating via a base station with a user equipment over a partially wireless connection.

It is noted that the host computer 3310, base station 3320 and UE 3330 illustrated in FIG. 20 may be identical to the host computer 3230, one of the base stations 3212a, 3212b, 3212c and one of the UEs 3291, 3292 of FIG. 19, respectively. This to say, the inner workings of these entities may be as shown in FIG. 20 and independently, the surrounding network topology may be that of FIG. 19.

In FIG. 20, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, security, and thereby provide benefits such as corresponding effect on the OTT service: e.g. reduced user waiting time, relaxed restriction on file size, better responsiveness, extended battery lifetime, security.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 21 is a flowchart illustrating a method implemented in a communication system, in accordance with one embodiment. The communication system includes a host computer, a base station such as the DU node 111 or the CU node 112 in the network node 110, and a UE such as the UE 120, which may be those described with reference to FIG. 19 and FIG. 20. For simplicity of the present disclosure, only drawing references to FIG. 21 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 22 is a flowchart illustrating a method implemented in a communication system, in accordance with one embodiment. The communication system includes a host computer, a base station such as an AP STA, and a UE such as a Non-AP STA which may be those described with reference to FIG. 19 and FIG. 20. For simplicity of the present disclosure, only drawing references to FIG. 22 will be included in this section. In a first action 3510 of the method, the host computer provides user data. In an optional subaction not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 23 is a flowchart illustrating a method implemented in a communication system, in accordance with one embodiment. The communication system includes a host computer, a base station such as an AP STA, and a UE such as a Non-AP STA which may be those described with reference to FIG. 19 and FIG. 20. For simplicity of the present disclosure, only drawing references to FIG. 23 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station such as an AP STA, and a UE such as a Non-AP STA which may be those described with reference to FIG. 19 and FIG. 20. For simplicity of the present disclosure, only drawing references to FIG. 24 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a Distributed Unit, DU, node for handling a message in a communication between a User Equipment, UE, the DU node and a Central Unit, CU, node in a wireless communications network, the method comprising:
   obtaining a secondary security key from a network node, which secondary security key is associated with the DU node;
   receiving the message from any one out of: the UE and the CU node, which message is security protected with any one or more out of: a first security key, and the secondary security key, which message or part of message, is not usable by the DU node when security protected with the first security key;
   determining that at least a part of the message is security protected with the secondary security key;
   security processing the at least the part of the message security protected with the secondary security key; and
   taking actions related to the communication based on information in the security processed message.

2. The method according to claim 1, further comprising:
   generating a Downlink, DL, message security protected with the secondary security key; and
   providing the generated DL message to the UE.

3. The method according to claim 1, wherein the determining that at least a part of the message is security protected with the secondary security key is based on any one or more out of:
   that the message is received on a radio bearer associated with the secondary security key;
   that the message comprises a Logical Channel Identity, LCID, associated with the secondary security key;
   that a flag is comprised in a header of the message, indicating that the secondary security key shall be used for the message;
   that the message comprises an indication that the message or a part of the message is for the DU node and need not be forwarded to the CU node, wherein the message is an UL message from UE; and
   that the message comprises an indication that the message or a part of the message is for the DU node and need not be forwarded to the UE, wherein the message is an DL message from CU node.

4. The method according to claim 1, wherein taking actions related to the communication based on information in the security processed message are performed independently of any of the CU node and the UE.

5. The method according to claim 1, wherein the taking actions related to the communication based on information in the security processed message comprises any one or more out of:
- providing an indication to the UE to change the UE behaviour;
- adjusting any one or more out of Uplink, UL, data of certain bearers, and Downlink, DL, data, of certain bearers;
- starting or stopping duplication of UL or DL data of some bearers;
- changing, removing, or adding cells;
- adjusting routing path for data;
- recording logs; and
- providing logs to other nodes for data analytics.

6. The method according to claim 1, wherein any one or more out of:
- security protecting the message is represented by any one or more out of: encrypting the message, or integrity-protecting the message; and
- security processing the message is represented by any one or more out of: decrypting the security protected message, or integrity-verify the security protected message.

7. A method performed by a User Equipment, UE, for handling a message in a communication between the UE, a Distributed Unit, DU, node, and a Central Unit, CU, node in a wireless communications network, the method comprising:
- obtaining a first security key associated with the CU node, and a secondary security key associated with the DU node, a message security protected with the first security key not being usable by the DU node;
- determining which one out of the first security key and the secondary security key that is to be used for at least a part of a message, for security protection;
- when determining that the secondary security key is used for at least a part of the message for security protection, communicating the message with the DU node, wherein at least part message is security protected with the secondary security key; and
- the security protection with the secondary security key enabling the DU node to security process the at least the part of the message, and take actions related to the communication based on information in the security processed message.

8. The method according to claim 7, wherein the communicated message comprises an indication indicating that at least part message is security protected with the secondary security key, which indication comprises any one or more out of:
- that the message is communicated on a radio bearer associated with the secondary security key;
- that the message comprises a Logical Channel Identity, LCID, associated with the secondary security key;
- that a flag is comprised in a header of the message, indicating that the secondary security key shall be used for the message;
- that the message or a part of the message is for the DU node and need not be forwarded to the CU node, wherein the message is an UL message from UE; and
- that the message comprises an indication that the message or a part of the message is for the DU node and need not be forwarded to the UE, wherein the message is an DL message from CU node.

9. The method according to claim 7, wherein any one or more out of:
- security protecting the message is represented by any one or more out of: encrypting the message, or integrity-protecting the message; and
- security processing the security protected message is represented by any one or more out of: decrypting the security protected message, or integrity-verify the security protected message.

10. The method according to claim 7, wherein the secondary security key associated with the DU node is obtained by any one out of:
- obtaining a parameter for deriving the secondary security key; and
- obtaining the secondary security key from a network node.

11. A Distributed Unit, DU, node configured to handle a message in a communication between a User Equipment, UE, the DU node and a Central Unit, CU, node in a wireless communications network, the DU node further being configured to:
- obtain a secondary security key from a network node, which secondary security key is adapted to be associated with the DU node;
- receive the message from any one out of: the UE and the CU node, which message is adapted to be security protected with any one or more out of: a first security key, and the secondary security key, which message or part of message is arranged to not be usable by the DU node when security protected with the first security key;
- determine that at least a part of the message is security protected with the secondary security key;
- security process the at least the part of the message security protected with the secondary security key; and
- take actions related to the communication based on information in the security processed message.

12. The DU node according to claim 11, wherein the DU node further is configured to:
- generate a Downlink, DL, message security protected with the secondary security key; and
- provide the generated DL message to the UE.

13. The DU node according to claim 11, wherein the DU node further is configured to determine that at least a part of the message is security protected with the secondary security key based on any one or more out of:
- that the message is received on a radio bearer associated with the secondary security key;
- that the message comprises a Logical Channel Identity, LCID, associated with the secondary security key;
- that a flag is comprised in a header of the message, indicating that the secondary security key shall be used for the message;
- that the message comprises an indication that the message or a part of the message is for the DU node and need not be forwarded to the CU node, wherein the message is adapted to be an UL message from UE; and
- that the message comprises an indication that the message or a part of the message is for the DU node and need not be forwarded to the UE, wherein the message is adapted to be an DL message from CU node.

14. The DU node according to claim 11, wherein the DU node is further configured to take actions related to the communication based on information in the security processed message, which actions are arranged to be performed independently of any of the CU node and the UE.

15. The DU node according to claim 11, wherein the DU node is further configured to take actions related to the communication based on information in the security processed message by:
- providing an indication to the UE to change the UE behaviour;
- adjusting any one or more out of Uplink, UL, data of certain bearers, and Downlink, DL, data, of certain bearers;
- starting or stopping duplication of UL or DL data of some bearers;
- changing, removing, or adding cells;
- adjusting routing path for data;
- recording logs; and
- providing logs to other network nodes for data analytics.

16. The DU node according to claim 11, wherein any one or more out of:
- security protected message is adapted to be represented by any one or more out of: encrypted message, or integrity-protected message; and
- usage of the security protected message is adapted to be represented by any one or more out of: decrypting the security protected message, or integrity-verify the security protected message.

17. A User Equipment, UE, configured to handle a message in a communication between the UE, a Distributed Unit, DU, node, and a Central Unit, CU, node in a wireless communications network, the UE further being configured to:
- obtain a first security key adapted to be associated with the CU node, and a secondary security key adapted to be associated with the DU node, a message security protected with the first security key being arranged to not be usable by the DU node;
- determine which one out of the first security key and the secondary security key that is to be used for at least a part of a message, for security protection;
- when determining that the secondary security key is used for at least a part of a message for security protection, communicate the message with the DU node, wherein at least part message is arranged to be security protected with the secondary security key; and
- the security protection with the secondary security key being adapted to enable the DU node to use the at least the part of the message, and take actions related to the communication based on information in the security processed message.

18. The UE according to claim 17, wherein the communicated message is adapted to comprise an indication indicating that at least part message is security protected with the secondary security key, which indication is adapted to comprise any one or more out of:
- that the message is communicated on a radio bearer associated with the secondary security key;
- that the message comprises an Logical Channel Identity, LCID, associated with the secondary security key;
- that a flag is comprised in a header of the message, indicating that the secondary security key shall be used for the message;
- that the message or a part of the message is for the DU node and need not be forwarded to the CU node, wherein the message is adapted to be an UL message from UE; and
- that the message comprises an indication that the message or a part of the message is for the DU node and need not be forwarded to the UE, wherein the message is adapted to be an DL message from CU node.

19. The UE according to claim 17, wherein any one or more out of:
- security protecting the message is adapted to be represented by any one or more out of: encrypting the message, or integrity-protecting the message; and
- use of the security protected message is adapted to be represented by any one or more out of: decrypt the security protected message, or integrity-verify the security protected message.

20. The UE according claim 17, wherein the UE further is configured to obtain the security key adapted to be associated with the DU node by any one out of:
- obtain a parameter arranged for deriving the secondary security key; and
- obtain the secondary security key from a network node.

* * * * *